(12) United States Patent
Sasaki

(10) Patent No.: US 6,873,365 B1
(45) Date of Patent: Mar. 29, 2005

(54) TIMING GENERATOR OF IMAGE INPUT DEVICE

(75) Inventor: Gen Sasaki, Osaka (JP)

(73) Assignee: Mega Chips Corporation, Osaka (JP)

( * ) Notice: Subject to any disclaimer, the term of this patent is extended or adjusted under 35 U.S.C. 154(b) by 0 days.

(21) Appl. No.: 09/488,712

(22) Filed: Jan. 21, 2000

(30) Foreign Application Priority Data

Feb. 12, 1999 (JP) .......................................... P11-034978

(51) Int. Cl.[7] .......................... H04N 3/14; H04N 5/335
(52) U.S. Cl. ........................................ 348/312; 377/53
(58) Field of Search ........................... 348/312; 377/53, 377/54, 62, 63

(56) References Cited

U.S. PATENT DOCUMENTS 4,841,369 A  *  6/1989 Nishizawa et al. ......... 348/302
5,339,161 A  *  8/1994 Masui ........................ 348/312

FOREIGN PATENT DOCUMENTS

| JP | 59-186480 | 10/1984 |
| JP | 08-237551 | 9/1996 |
| JP | 09-321812 | 12/1997 |
| JP | 10-304190 | 11/1998 |

* cited by examiner

Primary Examiner—Wendy R. Garber
Assistant Examiner—Matthew L Rosendale
(74) Attorney, Agent, or Firm—Oblon, Spivak, McClelland, Maier & Neustadt, P.C.

(57) ABSTRACT

Any complicates pulse waveform required depending on the type of CCD, can be generated with a simple circuit configuration. Specifically, any complicated pulse is obtainable by inputting an unlimited number of toggle timings, with no limitation imposed on the number of toggle timings inputted. This is achieved only by inputting different toggle timings sequentially from the exterior, because the toggle timing of toggle circuits (14 to 16) is regulated by shift registers (12a, 12b) of a loop structure and comparators (11a, 11b) connected to the rearmost stage of their respective shift registers (12a, 12b).

11 Claims, 18 Drawing Sheets

F/G. 2

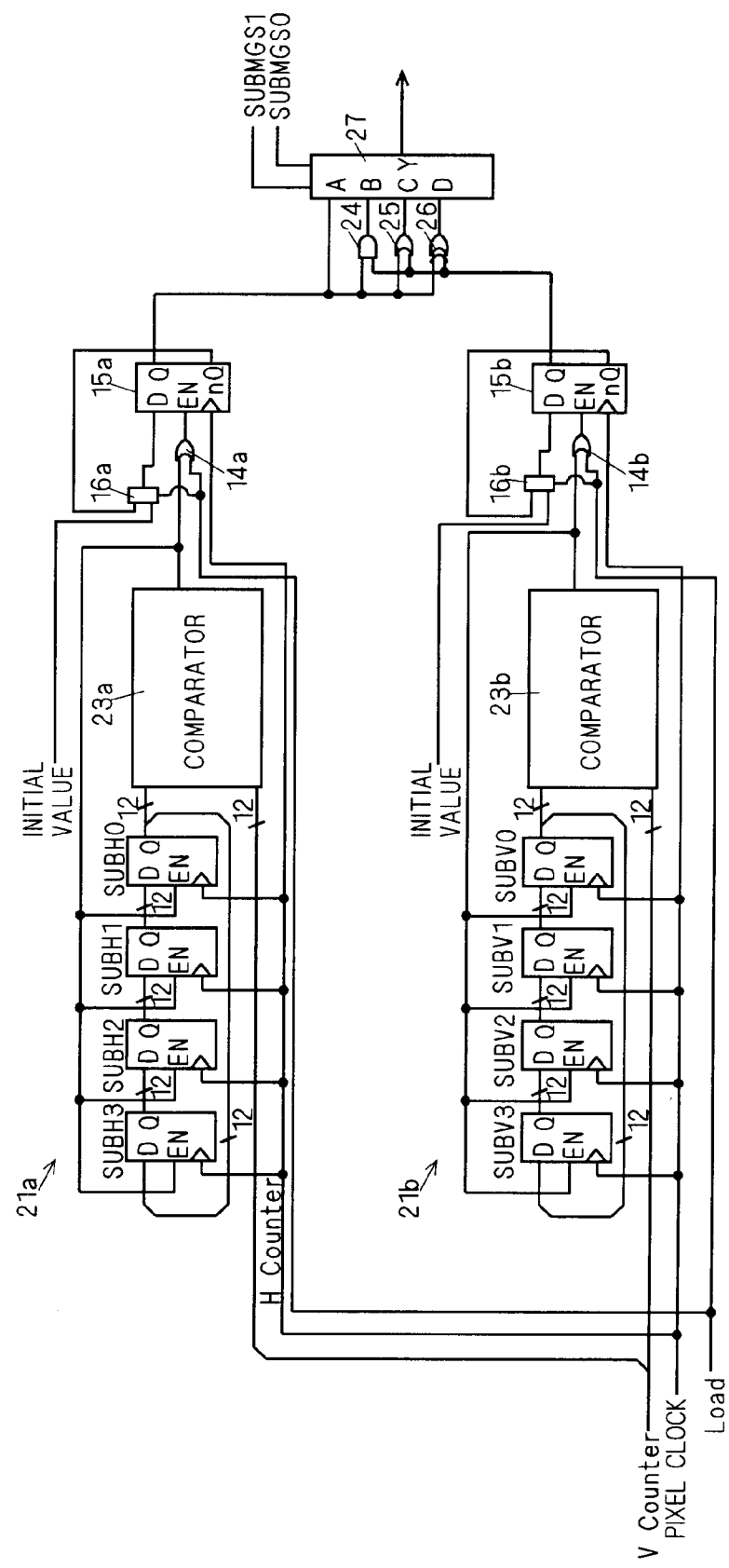
F I G. 4

F/G. 11

TIMING GENERATOR OF IMAGE INPUT DEVICE

BACKGROUND OF THE INVENTION

1. Field of the Invention

The present invention relates to a timing generator of an image input device such as a digital still camera.

2. Description of the Background Art

FIG. 18 is a block diagram illustrating a conventional timing generator that generates four toggles in a cycle in an image input device such as a digital still camera. As shown in FIG. 18, in the conventional timing generator, registers 2a to 2d are connected to multiple comparators 1a to 1d at their respective input terminals on one side, and the count value (H count) of a horizontal synchronizing frequency signal and the count value (V count) of a vertical synchronizing frequency signal are inputted to the input terminals on the other side of the comparators 1a to 1d. The values inputted from a CPU (not shown) are stored in the registers 2a to 2d. When the count value of a horizontal or vertical synchronizing frequency signal (H count or V count) is inputted to the comparators 1a to 1d, this count value is compared with the value of the registers 2a to 2d. If they agree, a comparative signal is outputted. The comparative signals from the comparators 1a to 1d are then inputted to a first OR circuit 3, and the result of the OR operation is inputted, as an enable signal (EN), to a toggle flip-flop 5 through a second OR circuit 4. Here, it is arranged that a load signal (load) for the initial operation instruction from the CPU is also inputted to the second OR circuit 4.

In FIG. 18, reference numeral 6 designates a selector. When an enable signal (EN) of the toggle flip-flop 5 is in high state, signal (D) from the selector 6 is outputted as an output signal Q, at the timing of the rise of a pixel clock. In the selector 6 it is arranged that the value of signal from an inverted output terminal nQ of the toggle flip-flop 5 (hereinafter referred to as "an inverted output value") and a predetermined initial value are selected, depending on the load signal (load) from the CPU.

Specifically, in the conventional timing generator, at the initial operation, a load signal is provided from the CPU and, in response to this, the selector 6 selects the predetermined initial value. Since an enable signal from the second OR circuit 4 becomes high state by the load signal from the CPU, the toggle flip-flop 5 outputs, as an output signal, the predetermined initial value selected by the selector 6, at the timing of the rise of a pixel clock. At the same time, an inverted output value from the toggle flip-flop 5 is inputted to the selector 6.

When the count value of a horizontal or vertical synchronizing frequency signal (H count or V count) is inputted, the comparators 1a to 1d compare this count value with the value of the registers 2a to 2d, and, if they agree, output a comparative signal. The comparative signals from the comparators 1a to 1d are then inputted to the first OR circuit 3, and the result of the OR operation is inputted, as an enable signal (EN), to the toggle flip-flop 5 through the second OR circuit 4.

When an enable signal is inputted one after another in the above manner, it is arranged such that, at the time of input, the inverted output value of the toggle flip-flop 5 itself is inputted to the toggle flip-flop 5 in a feedback fashion, through the selector 6. This allows to repeat a toggle operation in the toggle flip-flop 5.

With the conventional timing generator described, in principle, the output timing of a pixel data from a CCD (not shown) does not agree with the timing of a processing clock of the CPU. Therefore, if it is desired to rewrite the data of the registers 2a to 2d at a certain timing, the respective comparators 1a to 1d compare the data in a transition state related to rewriting, with the count value of a horizontal or vertical synchronizing frequency signal (H count or V count). If there should be agreement in a moment, a malfunction occurs in the comparators 1a to 1d. This can cause hazard to the timing of the drive pulse of the CCD.

Further, the conventional timing generator requires one register (2a to 2d) and one comparator (1a to 1d), per toggle timing. In the practical digital still cameras, however, a complicated special pulse is required in some cases. In order to generate such a complicated special pulse waveform, circuit size is greatly increased.

SUMMARY OF THE INVENTION

According to a first aspect, the present invention resides in a timing generator of an image input device which regulates a read timing in reading a pixel data from an image pickup device of the image input device, the timing generator comprising: a shift register having a plurality of registers to form a loop structure by which the output from the rearmost stage register is inputted to the foremost stage register; a comparator that compares the output from the shift register with the count value of a horizontal frequency signal or vertical frequency signal; and a toggle circuit that repeats a toggle operation based on the output signal from the comparator.

According to a second aspect, the timing generator of the first aspect is characterized in that the toggle circuit has a selector for inputting an initial value when a toggle operation is reset.

According to a third aspect, the timing generator of the first or second aspect is characterized in that a selector selecting a toggle timing data stored in an external main memory and the output from the rearmost stage register, is connected to the foremost stage register of the shift register.

According to a fourth aspect, the timing generator according to any one of the first to third aspects is characterized in that, when the number of registers in the shift register is more than three, a selector is connected to a data input terminal of an intermediate stage register in the shift register; and the output from the rearmost stage register is inputted to not only the foremost stage register but also the intermediate stage register through the selector connected to the data input terminal of the intermediate stage register.

According to a fifth aspect, the invention resides in a timing generator of an image input device which regulates a read timing in reading a pixel data from an image pickup device of the image input device, the timing generator comprising: a first shift register having a plurality of registers to form a loop structure by which the output from the rearmost stage register is inputted to the foremost stage register; a first comparator that compares the output from the first shift register with the count value of a horizontal frequency signal or vertical frequency signal; a first toggle circuit that repeats a toggle operation based on the output signal from the first comparator; a second shift register that is disposed in parallel with the first shift register, having a plurality of registers to form a loop structure by which the output from the rearmost stage register is inputted to the foremost stage register; a second comparator that compares the output from the second shift register with the count value of a horizontal frequency signal or vertical frequency signal; a second toggle circuit that repeats a toggle operation based on the output signal from the second comparator; a logical operation block that performs predetermined multiple logical operations of the output from the first toggle circuit and the output from the second toggle circuit; and a selector that selects one of the multiple logical operations performed in the logical operation block.

According to a sixth aspect, the timing generator of the fifth aspect is characterized in that the logical operation block is configured such as to perform three logical operations including at least AND operation and OR operation.

According to a seventh aspect, the present invention resides in a timing generator of an image input device which regulates a read timing in reading a pixel data from an image pickup device of the image input device, the timing generator comprising: a horizontal cycle block that outputs a horizontal cycle pulse in image obtained by the image pickup device; a vertical cycle block that outputs a vertical cycle pulse in image obtained by the image pickup device; a vertical-horizontal block that outputs a desired pulse in synchronization with the horizontal and vertical cycle blocks; a first logical operation block that performs predetermined multiple logical operations of the output from the vertical-horizontal block and the output from the horizontal cycle block; a first selector that selects one of the multiple logical operations performed in the first logical operation block; a second logical operation block that performs predetermined multiple logical operations of the result of selection obtained in the first selector and the output from the vertical cycle block; and a second selector that selects one of the multiple logical operations performed in the second logical operation block.

According to an eighth aspect, the timing generator of the seventh aspect is characterized in that the horizontal cycle block comprises: (a) a first shift register having a plurality of registers to form a loop structure by which the output from the rearmost stage register is inputted to the foremost stage register; (b) a first comparator that compares the output from the first shift register with the count value of a horizontal frequency signal; and (c) a first toggle circuit that repeats a toggle operation based on the output signal from the first comparator, the vertical cycle block comprises: (d) a second shift register having a plurality of registers to form a loop structure by which the output from the rearmost stage register is inputted to the foremost stage register; (e) a second comparator that compares the output from the second shift register with the count value of a vertical frequency signal; and (f) a second toggle circuit that repeats a toggle operation based on the output signal from the second comparator, and the vertical-horizontal cycle block comprises: (g) a third shift register similar to the first shift register of the horizontal cycle block; (h) a fourth shift register similar to the second shift register of the vertical cycle block; (i) an AND operation circuit that carries out a logical production of the third and fourth shift registers; (j) a third toggle circuit that repeats a toggle operation based on the output signal from the AND operation circuit; and (k) a forced circuit by which the AND operation circuit is forced to be set to a predetermined logical state at any timing provided from the exterior, based on the output from the fourth shift register.

According to a ninth aspect, the timing generator of the fifth or sixth aspect further comprises a selection determining block that determines a logical operation selection switching in the selector, and characterized in that the first comparator has the function of comparing the output from the first shift register with the count value of the horizontal frequency signal; the second comparator has the function of comparing the output from the second shift register with the count value of the horizontal frequency signal; and the selection determining block is a shift register that performs shifting of a register value at any timing including a horizontal cycle, to execute a logical operation selection switching in the selector.

According to a tenth aspect, the present invention resides in a timing generator of an image input device which regulates a read timing in reading a pixel data from an image pickup device of the image input device, the timing generator comprising: a pulse generating circuit that generates a pulse signal of a desired first pattern; a first pulse change circuit on which at least part of the pulse signal of the first pattern supplied from the pulse generating circuit is masked for removal; and a second pulse change circuit that adds a new address to a pulse signal obtained by the removal on the first pulse change circuit, the pulse generating circuit having: (a) a first shift register having a plurality of registers to form a loop structure by which the output from the rearmost stage register is inputted to the foremost stage register; (b) a first comparator that compares the output from the first shift register with the count value of a horizontal frequency signal; and (c) a first toggle circuit that repeats a toggle operation based on the output signal from the first comparator, the first pulse change circuit having: (d) a second shift register having a plurality of registers to form a loop structure by which the output from the rearmost stage register is inputted to the foremost stage register; (e) a second comparator that compares the output from the second shift register with the count value of a horizontal or vertical frequency signal; and (f) a second toggle circuit that repeats a toggle operation based on the output signal from the second comparator, the second pulse change circuit having: (g) a third shift register having a plurality of registers to form a loop structure by which the output from the rearmost stage register is inputted to the foremost stage register; (h) a third comparator that compares the output from the third shift register with the count value of a horizontal or vertical frequency signal; and (i) a third toggle circuit that repeats a toggle operation based on the output signal from the third comparator. This timing generator has the feature that a first logical operation is carried out in a predetermined logical operation block between the pulse generating circuit and the first pulse change circuit, so that at least part of a pulse signal of the first pattern is masked for removal, then, a second logical operation is carried out in a predetermined logical operation block between the pulse generating circuit and the second pulse change circuit, so that a new pulse is added to the result of the first logical operation.

According to an eleventh aspect, the present invention resides in a timing generator of an image input device which regulates a read timing in reading a pixel data from an image pickup device of the image input device, the timing generator comprising: a pulse generating circuit that generates a desired pulse signal; a continuous clock generating block that generates a continuous clock signal in a given cycle; a full cycle pulse generating block that outputs a desired periodic signal at a full cycle timing related to a read timing of the image pickup device; and a selector that selects the output from the continuous clock generating block and the output from the pulse generating circuit, at a desired timing based on the output from the full cycle pulse generating block, the pulse generating circuit having at least: (a) a shift register having a plurality of registers to form a loop structure by which the output from the rearmost stage register is inputted to the foremost stage register; (b) a first comparator that compares the output from the shift register with the count value of a horizontal or vertical frequency signal; and (c) a first toggle circuit that repeats a toggle operation based on the output signal from the first comparator, the continuous clock generating block having: (d) a counter that counts pixel clock signals supplied from the exterior; (e) an interval register defining a predetermined specific cycle; (f) a second comparator that compares the value of the specific cycle defined by the interval register, with the count result of the counter, to output a reset signal to the counter per the specific cycle; (g) a shift register having at least two registers connected in tandem, so as to form a loop structure; (h) a third comparator that compares the output from the shift register with the output from the counter; and (i) a second toggle circuit that repeats a toggle operation based on the output signal from the third comparator.

With the first aspect, the toggle timing of the toggle circuit is regulated by the shift register of a loop structure and the comparator connected to the rearmost stage of this register. Therefore, when a different toggle timing is inputted sequentially from the exterior to this shift register, it is possible to input an unlimited number of toggle timings with no limitation imposed on the number of toggle timings inputted. That is, for realizing many toggle timings, there may be provided registers and comparators so as to correspond to the number of toggle timings. In this case, however, the number of toggle timings is limited to the number of registers or comparators. Accordingly, if more toggle timings is desired, the corresponding registers and comparators should be disposed previously. Whereas in the first aspect, an unlimited number of toggle timings can be inputted by using a shift register having a lesser number of registers. This allows to reduce the circuit size, thus enabling to reduce the area and power consumption of the circuit. Consider now the case that a toggle timing data is inputted to a timing generator from the exterior. With the configuration that a toggle timing data is inputted to a register connected directly to a comparator, due to transition of the value (address) in the register, the comparator can make an error in comparative judgment, thereby causing hazard to the timing at which data is inputted. On the other hand, with the first aspect, the element for making input to the comparator is limited to the rearmost stage register of the shift register, and the preceding registers are not connected directly to the comparator. It is therefore possible to prevent the comparator from making an erroneous comparative judgment due to transition of a toggle timing provided from the external memory or the like, and thus avoiding hazard to the timing at which data is inputted.

With the second aspect, an initial value can be inputted only by that the reset of the toggle circuit is switched by the selector, thus permitting an easy initialization on a simple circuit.

With the third aspect, when many toggle timings are inputted sequentially to the shift register, a great deal of toggle timing data can be stored in time series in the external main memory, so that data is inputted sequentially to the selector by direct memory access or the like. Thus, within the capacity of the main memory, a great deal of toggle timing data with almost no limitation imposed is readily supplied to the shift register through the selector. Based on this data, an unlimited number of toggle operations are executable.

With the fourth aspect, if it is desired to perform a repeat toggle operation of a given cycle having a number that is lesser than the number of the registers of the shift register and, at the same time, is not a common divisor of the number of the registers, this operation can be performed easily because the output from the rearmost stage register is inputted to not only the foremost stage register but also an intermediate stage register through the selector connected to the data input terminal of the intermediate stage register.

With the fifth or sixth aspect, any complicated pulses can be generated with a small circuit configuration by executing various logical operations, because the output from the first toggle circuit and the output from the second toggle circuit are subjected to predetermined multiple logical operations, and the selector selects one of these logical operations.

With the seventh or eighth aspect, the vertical-horizontal cycle block is used in combination with the horizontal and vertical cycle blocks, by switching it to horizontal or vertical cycle function, depending on the type of CCD that is mounted on an image input device, as an image pickup device. This facilitates to generate any complicate pulse waveform required depending on the type of CCD. In particular, with the eighth aspect, an unlimited number of toggle timings can be inputted by using the shift registers of a lesser number of registers. This allows to reduce the circuit size, and thus permits a reduction in the circuit area and power consumption. This also prevents each comparator from causing an erroneous comparative judgement due to transition of a toggle timing provided from the external memory or the like, and thus avoids hazard to the timing at which data is inputted.

With the ninth aspect, any complicated pulse can be generated freely with a small circuit size, because the selection determining block determines a logical operation selection switching in the selector, by shifting the register value at any timing including a horizontal cycle.

With the tenth aspect, a variety of complicated pulses in which part of pulses appears at an irregular timing, can be generated freely with a small circuit size, because at least part of the pulse signals of a first pattern supplied from the pulse generating circuit is masked for removal on the first pulse change circuit, and a new pulse is added to the pulse signal obtained by the removal on the first pulse change circuit, on the second pulse change circuit.

With the eleventh aspect, a complicated pulse, part of which is a continuous clock signal and the rest is a periodic repeat pulse signal, can be generated freely with a small circuit size, because the continuous clock generating block generates a clock signal that is continuous in a given cycle, and the selector performs switching between the clock signal and a desired pulse signal from the pulse generating circuit.

An object of the present invention is to provide a timing generator of an image input device which can prevent hazard to the timing of the drive pulse of a CCD caused by transition of register provided from a CPU.

Another object of the present invention is to provide a timing generator of a digital still camera with which a complicated special pulse waveform can be generated by a simple circuit configuration.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a block diagram illustrating a timing generator of an image input device according to a third preferred embodiment;

DESCRIPTION OF THE PREFERRED EMBODIMENTS

First Preferred Embodiment

Figure 1:
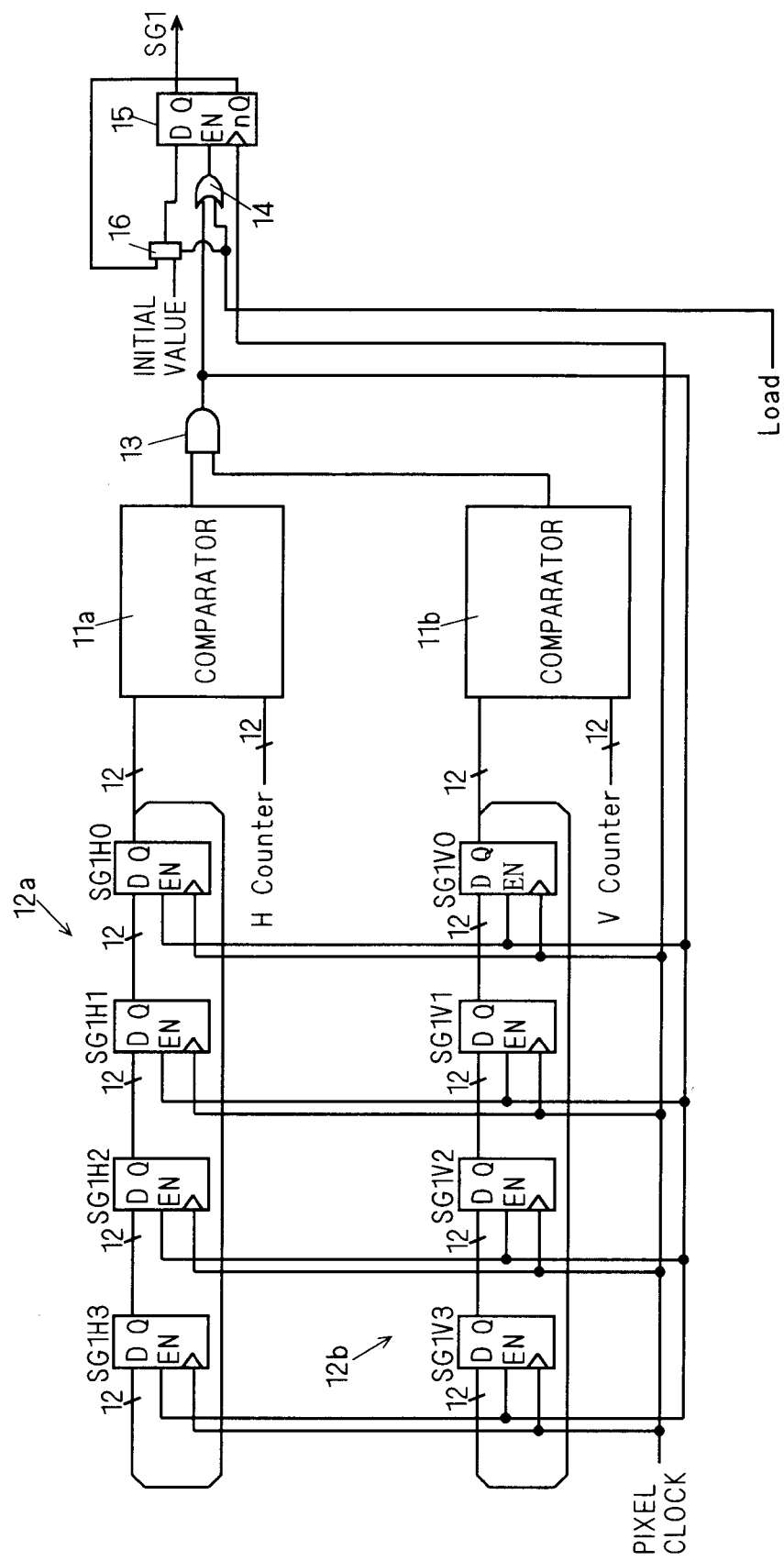
FIG. 1 is a block diagram illustrating a timing generator of an image input device according to a first preferred embodiment of the invention.

FIG. 1 is a block diagram illustrating the configuration of a timing generator of a digital still camera (an image input device), according to a first preferred embodiment of the invention. Upon readout of a pixel data from a CCD (not shown) as an image pickup device, the timing generator generates and outputs a pulse signal at a predetermined toggle timing, based on a predetermined toggle timing data stored previously in a main memory or the like, which is disposed outside of the timing generator in the digital still camera (hereinafter referred to as "an external memory or the like"). Specifically, the timing generator is used in the case that the toggle timing of a horizontal drive pulse is previously stored in, for example, an external memory or the like, and a read pulse is repeatedly generated and outputted in each frame period. In this timing generator, the following arrangements are made so as to avoid hazard to a read timing that will be caused by transition of address provided from an external memory or the like. That is, in order that data is read from the external memory or the like, and the count value of a horizontal synchronizing frequency signal (H count) and the count value of a vertical synchronizing frequency signal (V count) are compared in comparators 11a and 11b, there are provided, as a block for inputting an address to the comparators 11a and 11b, shift registers 12a and 12b which hold the toggle timing of an output signal and have a circuit looping the output of the rearmost stage to the input of the foremost stage. Data is inputted from the shift registers 12a and 12b to the comparators 11a and 11b, at the same time that synchronization is established by the clock of the CCD as an image pickup device, and then the data of the drive counter of the CCD changes.

Specifically, as shown in FIG. 1, the timing generator comprises, two shift registers 12a and 12b, each having a loop structure; two comparators 11a and 11b that compare the output of the rearmost stages of the shift registers 12a and 12b, with the output of V count value (V count) and H count value (H count), respectively; an AND circuit 13 that carries out AND operation of the output signals of comparison results obtained in the comparators 11a and 11b; an OR circuit 14 that carries out OR operation of an output signal from the AND circuit 13 and an initialization signal (load) from the CPU; and a flip-flop circuit 15 that toggles an output signal from the OR circuit 14, as an enable signal (EN).

Of the shift registers 12a and 12b, the shift register 12a comprises multiple (four stages) registers SG1H3 to SG1H0 in which the horizontal position addresses of image photographed by the CCD are stored for performing sequential shift. Output Q of the foremost stage register SG1H3 is inputted to a data input terminal D of the second stage register SG1H2, output Q of the second stage register SG1H2 is inputted to a data input terminal D of the third stage register SG1H1, output Q of the third stage register SG1H1 is inputted to a data input terminal D of the rearmost stage register SG1H0, and output Q of the rearmost stage register SG1H0 is inputted to a data input terminal D of the foremost stage register SG1H3. To the respective registers SG1H3 to SG1H0, an output signal from the AND circuit 13 is provided as an enable signal (EN) with which a shift operation is accepted, and an actual shift operation is carried out in synchronization with a pixel clock that regulates the rate of readout of a pixel data from the CCD. Of the shift registers 12a and 12b, the other shift register 12b comprises multiple (four stages) registers SG1V3 to SG1V0 in which the vertical position addresses of image photographed by the CCD are stored for performing sequential shift. Output Q of the foremost stage register SG1V3 is inputted to a data input terminal D of the second stage register SG1V2, output Q of the second stage register SG1V2 is inputted to a data input terminal D of the third stage register SG1V1, output Q of the third stage register SG1V1 is inputted to a data input terminal D of the rearmost stage register SG1V0, and output Q of the rearmost stage register SG1V0 is inputted to a data input terminal D of the foremost stage register SG1V3. To the respective registers SG1V3 to SG1V0, an output signal from the AND circuit 13 is provided as an enable signal (EN) with which a shift operation is accepted, and an actual shift operation is carried out in synchronization with a pixel clock that regulates the rate of readout of a pixel data from the CCD. More specifically, a predetermined data such as the toggle timing of a read pulse from an external memory or the like, is stored in the shift registers 12a and 12b. Although wiring through which an initial data is provided to the registers SG1H3 to SG1H0, and SG1V3 to SG1V0, is omitted in FIG. 1, it is basically written by the CPU. A virtually unlimited number of setting of toggle timings is attainable by arranging so that data is selectively inputted to the input of the foremost stage register, by direct memory access (DMA) (see FIG. 2). In this case, the value of a pixel address from the external memory or the like, is always provided sequentially in the order read from the CCD, as a pair of two-dimensional data of a horizontal position address and a vertical position address.

The comparators 11a and 11b compare a horizontal position address and vertical position address provided from the rearmost stages SG1H0 and SG1V0 of their respective shift registers 12a and 12b, with V counter value (V count) and H counter value (H count) provided from a counter (not shown) disposed in the exterior. If they agree, the comparators 11a and 11b output a high signal. For instance, in the case that the horizontal position address and vertical position address of the toggle timing of a read pulse are stored in the shift registers 12a and 12b, when the position of the drive counter of the CCD (V counter value (V count) and H counter value (H count)) agrees with the address stored in the rearmost stage registers SG1H0 and SG1V0 of their respective shift registers 12a and 12b, the comparators 11a and 11b operate to output a high level.

The AND circuit 13 outputs a high signal only when in the comparator 11a, H counter value (H count) of the drive counter of the CCD agrees with a horizontal position, and V counter value (V count) of the drive counter of the CCD agrees with a vertical position. The high signal is then inputted to the OR circuit 14 and also inputted to the foremost stage registers SG1H3 and SG1V3, as an enable signal (EN). Accordingly, when the horizontal position address and vertical position address of a toggle timing are stored in the shift registers 12a and 12b, as described above, it is operated so as to output a high signal only when the position of the drive counter of the CCD (V counter value (V count) and H counter value (H count)) agrees with a toggle timing as a two-dimensional data provided from the external memory or the like. It is also operated so that the shift registers 12a and 12b are both shifted whenever agreement with the toggle timing is verified.

The OR circuit 14 provides an enable signal (EN) to the flip-flop circuit 15 when it receives either of an output signal from the AND circuit 13 and an initialization signal (load) from the CPU (not shown).

While an enable signal (EN) is inputted from the OR circuit 14, the flip-flop circuit 15 receives signal (D) from the selector 16 at the timing of the rise of a pixel clock, and employs the signal (D) as an output signal (Q), thereby outputting an output signal SG1. Here, in the selector 16, an inverted output value from an inverted output terminal nQ of the flip-flop circuit 15 is normally selected, and a predetermined initial value is selected only when a load signal (load) is provided from the CPU. The predetermined initial value is a signal to select high or low state in the initial condition, when the flip-flop circuit 15 is reset, that is, the time an initialization signal (load) is inputted. The OR circuit 14, flip-flop circuit 15 and selector 16 form a toggle circuit that repeats toggle on receipt of an enable signal (EN).

In the timing generator of the configuration described, at the initial operation, a load signal (load) is provided from the CPU (not shown) and, in response to this, the selector 16 selects a predetermined initial value. Since the enable signal (EN) from the OR circuit 14 becomes high state because of the load signal (load) from the CPU, the flip-flop circuit 15 outputs, as an output signal, the predetermined initial value selected by the selector 16, at the time of the rise of a pixel clock. At this time, the inverted output value (nQ) from the flip-flop circuit 15 is inputted to one input terminal of the selector 16.

Horizontal and vertical position addresses are provided to the foremost stage registers SG1H3 and SG1V3 of their respective shift registers 12a and 12b, from the external memory or the like, by direct memory access (DMA). Data of these paired addresses functions as a toggle timing data regulating the toggle timing of the flip-flop circuit 15.

Upon receipt of the count value of a horizontal or vertical synchronization frequency signal (H count or V count), the comparators 11a and 11b compare the received count value with the value (a toggle timing data) of the rearmost stage registers SG1H0 and SG1V0 of their respect shift registers 12a and 12b. If they agree, the comparators 11a and 11b output a comparative signal. The comparative signal is then inputted to the AND circuit 13, and the result of the AND operation is then inputted, as an enable signal (EN), to the flip-flop circuit 15 through the OR circuit 14.

When an enable signal is inputted one after another in the above manner, it is so arranged that, at the time of input, the inverted output value (nQ) of the toggle flip-flop itself is inputted to the toggle flip-flop 15 in a feedback fashion, through the selector 16. It is therefore possible to repeat a toggle operation in the flip-flop 15 for outputting an output signal Q (SG1).

Figure 18:
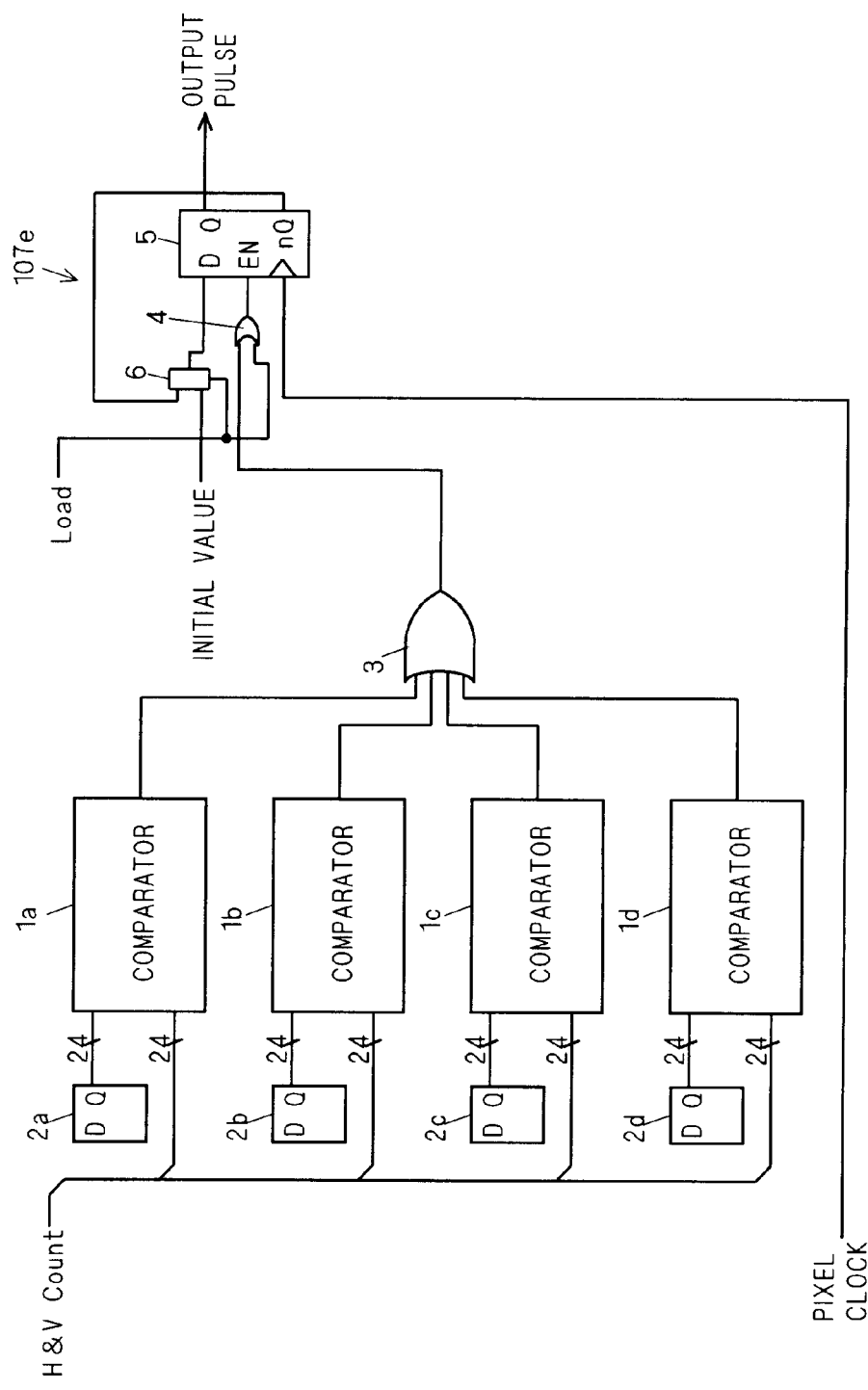
FIG. 18 is a block diagram illustrating a conventional timing generator of an image input device.

With this configuration, there is no need to dispose the comparators 1a to 1d for their respective registers 2a to 2d, as in the conventional case shown in FIG. 18. This permits a reduction in circuit size. In addition, a timing data is inputted only to the rearmost stage registers SG1H0 and SG1V of their respective comparators 11a and 11b. Therefore, even when writing to other registers SG1H3 to SG1H1, and SG1V3 to SG1V1 is performed asynchronously from the external memory or the like, the occurrence of an unexpected toggle timing is avoidable, thus preventing the occurrence of hazard as has been conventional.

In the conventional case shown in FIG. 18, it is difficult to change a toggle timing data while the timing generator is working, because the output signals of all the registers 2a to 2d are inputted to the comparators 1a to 1d. Also, a dynamic supply of a toggle timing data is very difficult because it is uncertain which one of registers 2a to 2d makes the next agreement with the counter value. Since the number of toggles of one pulse output is limited, it is very difficult to drive a variety of CCDs and CMOS sensors, and the like.

Whereas in the timing generator of the invention, it is configured that the shift registers 12a and 12b are provided as a register for inputting a toggle timing data to the comparators 11a and 11b. This permits a dynamic supply of a toggle timing data to the foremost stage registers SG1H3 and SG1V3. Therefore, any complicated pulse can be generated with no limit on the number of toggles, by the arrangement that a toggle timing data is stored in time series in the external memory, and then supplied to the foremost stage registers SG1H3 and SG1V3 of their respective shift registers 12a and 12b, by direct memory access (DMA).

Figure 2:
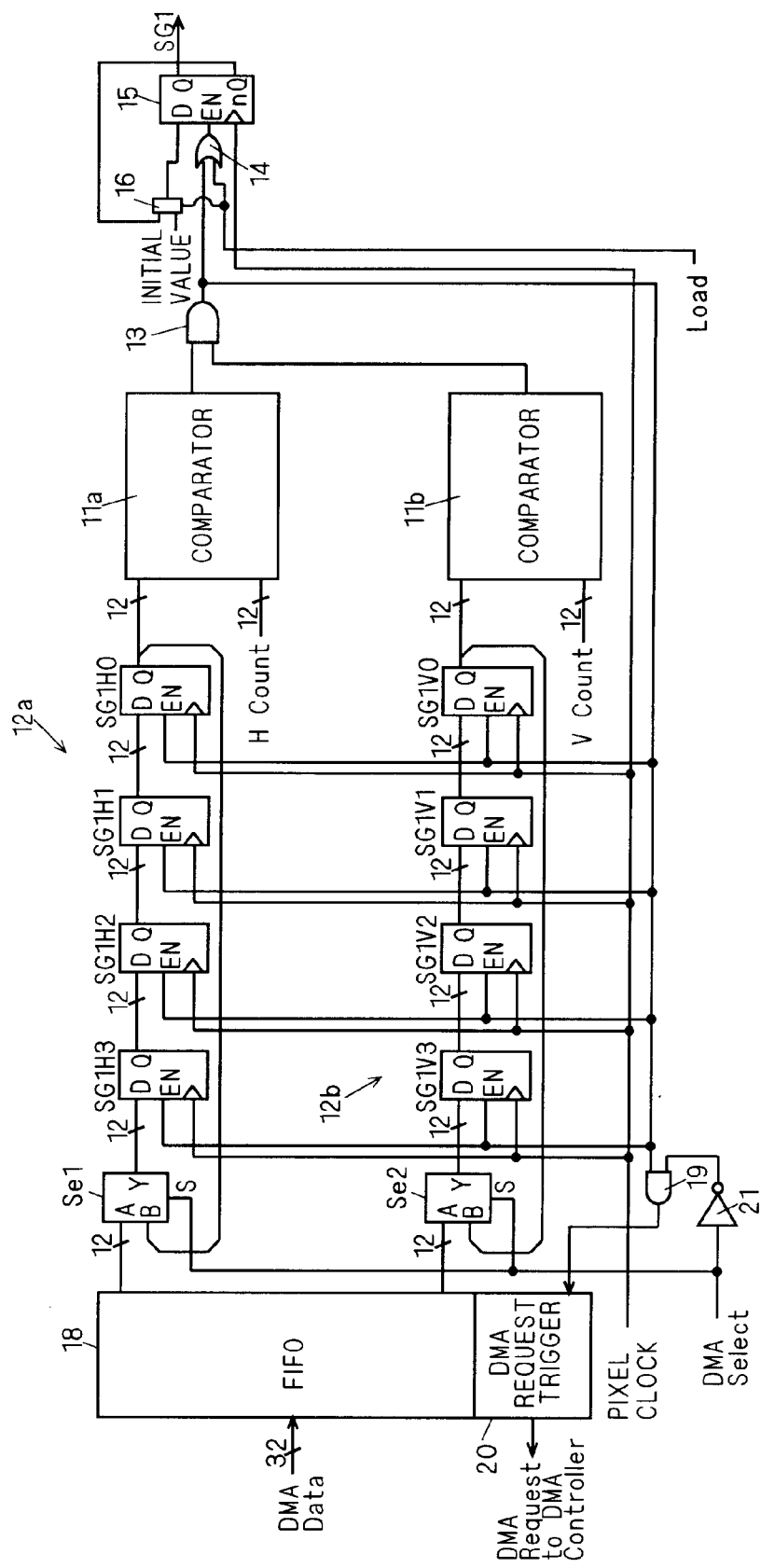
FIG. 2 is a block diagram illustrating one example of the timing generator in the first preferred embodiment.

FIG. 2 gives a circuit block diagram illustrating an example of the foregoing embodiment. In this example, selectors Se1 and Se2 are connected to data input terminals D of the foremost stage registers SG1H3 and SG1V3, respectively. A buffer 18 of one-word (or 32 bits) in length is connected to one input terminal of each of the selectors Se1 and Se2, and data output terminals Q of the rearmost stage registers SG1H0 and SG1V0 are connected to the other input terminal. When the selectors Se1 and Se2 select one input terminal, a toggle timing data which is supplied from an external memory or the like, by direct memory access (DMA), not through a CPU, is inputted to the foremost stage registers SG1H3 and SG1V3. When the selectors Se1 and Se2 selects the other input terminal, the data from the rearmost stage registers SG1H0 and SG1V0 is looped for supply. Output from an AND circuit 13 is inputted to an input terminal of another AND circuit 19, and then outputted to a DMA controller that controls direct memory access, through the AND circuit 19 and a DMA request trigger 20. This output works based on the input to the AND circuit 19 from an inversion element 21, only when a select signal for direct memory access (DMA selection) is supplied.

With the foregoing configuration, any complicated pulse can be generated easily by a simple arrangement, with no limit on the number of toggles.

Second Preferred Embodiment

Figure 3:
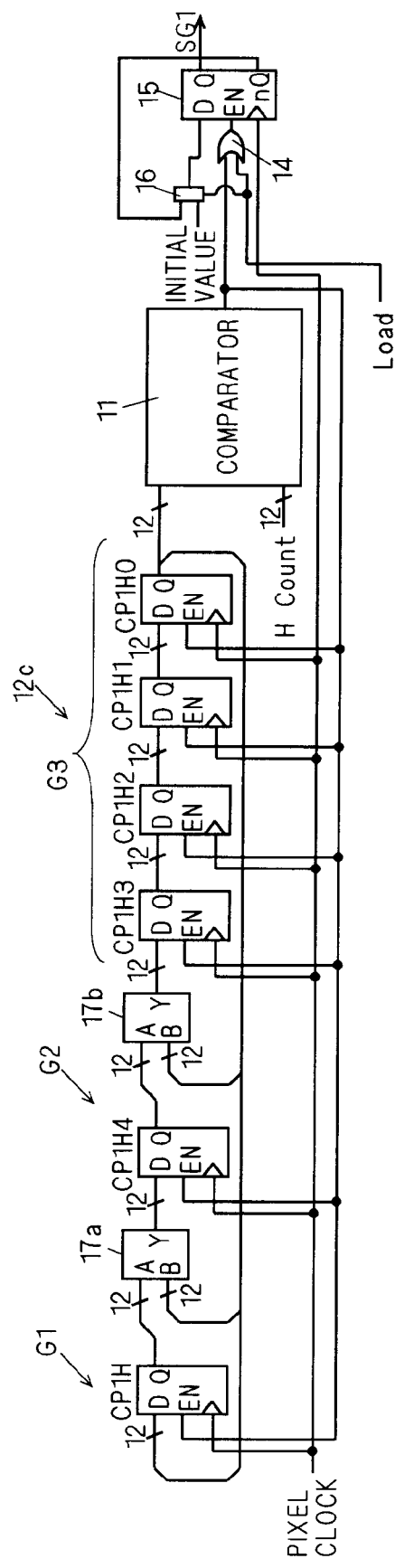
FIG. 3 is a block diagram illustrating a timing generator of an image input device according to a second preferred embodiment.

FIG. 3 is a block diagram of a timing generator according to a second preferred embodiment, which generates a predetermined timing pulse particularly about a horizontal position address of a digital still camera. In FIG. 3, the same elements as the first preferred embodiment have similar reference numerals.

When shift registers 12a and 12b are disposed in front of comparators 11a and 11b, as in the first preferred embodiment, although the number of stages of the shift registers 12a and 12b are large for a hardware configuration of a timing generator, so many stages are not required for an actual toggle timing in some cases. For instance, although six registers are disposed in the shift register, four toggle timings is sufficient in some cases. In the first preferred embodiment, however, it is essential to generation of the same pattern that one revolution of a toggle timing data is made in one cycle. Accordingly, for disposing six registers, after the toggle timing of pulse is generated four times, the remaining two toggles are supplied as an redundant toggle timing. With the configuration of the first preferred embodiment, it is therefore impossible to repeat practically a toggle timing only four times. In general, when the number of registers CP1H and CP1H4 to CP1H0 is three or more, if it is desired to set the number of toggles less than the maximum number of toggles, which is preset as a hardware configuration, in the shift register, this setting cannot be realized as it is.

For this, in the timing generator of this preferred embodiment, signals are fed back by forming loops to the intermediate stages of the registers in the shift register, in order to form loops less than the maximum number of toggles. This timing generator is shown in FIG. 3.

Specifically, in the timing generator of a digital still camera according to this preferred embodiment, the number of registers CP1H, CP1H4 to CP1H0 in the shift register 12c to be provided is M in number (M is three or more). When the value of M is not a common multiple of N (N=1, 2, 3, . . . ), even if it is desired to perform N toggles in a cycle, it is arranged that the output of the rearmost stage register CP1H0 can be inputted to the Nth register (e.g., CP1H, CP1H4, or CP1H3 in FIG. 3).

FIG. 3 illustrates a system having a maximum number of toggles is six. The foremost stage register CP1H forms for itself a first group G1, the next register CP1H4 forms for itself a second group G2, and the remaining four registers CP1H3 to CP1H0 form a third group G3. To each data input terminal D of the foremost registers CP1H4 and CP1H3 of the second and third groups G2 and G3, selectors 17a and 17b are connected, respectively, which select the data from their respective preceding stage registers CP1H and CP1H4, and the data from the rearmost stage register CP1H0.

Only output terminal Q of the rearmost stage register CP1H0 of the third group G3 is connected to one input terminal of a comparator 11. The count value of a horizontal synchronizing frequency signal (H count) from the exterior is inputted to the other input terminal of the comparator 11. If a toggle timing data obtained from the rearmost register CP1H0 of the shift register 12c agrees with the count value of the horizontal synchronizing frequency signal (H count), an enable signal (EN) is sent to a flip-flop circuit 15 through an OR circuit 14.

For example, when only one toggle is generated in a cycle, the same value may be set to all the registers CPH1, and CP1H4 to CP1H0.

When two toggles are generated in a cycle, the value of these toggles may be written alternately into paired adjacent registers of all the registers CP1H, and CP1H4 to CP1H0.

For three toggles in a cycle, this is attainable by making two groups, each consisting of three registers, and writing a similar data to the two groups.

On the other hand, four or five toggles per cycle, cannot be set because it does not return to the original toggle timing in a cycle. Therefore, selectors 17a and 17b are disposed at each data input terminal D of the registers CP1H4 and CP1H3 which correspond to the fourth and fifth registers from the rearmost stage, respectively. By virtue of the selectors 17a and 17b, the output data from the rearmost stage register CP1H0 can be inputted selectively. Selection operation of the selectors 17a and 17b makes it easy to generate four or five toggles in a cycle when six registers CP1H and CP1H4 to CPH0.

It should be noted that odd toggles per cycle is not normally used for the drive pulse of a CCD, and therefore, it will be usually sufficient if a selection input for four toggles is provided in the above example.

Third Preferred Embodiment

FIG. 4 is a diagram of a timing generator of a digital still camera, according to a third preferred embodiment. Letting an integer of more than three be N, this timing generator has multiple shift registers 21a and 21b (two shift registers are shown in FIG. 4), which are disposed in parallel, and composed of N (four stages are shown in FIG. 4) registers SUBH3 to SUBH0 and SUBV3 to SUBV0, respectively. The values of their respective rearmost registers SUBH0 and SUBV0 are compared with the count value of a vertical synchronizing frequency signal, in two comparators 23a and 23b, respectively. The results are inputted, as an enable signal (EN), to flip-flop circuits 15a and 15b, through OR circuits 14a and 14b, respectively. In FIG. 4, reference numerals 16a and 16b designate selectors corresponding to the selector 16 in the first and second preferred embodiments. The OR circuits 14a and 14b correspond to the OR circuit 14, and the flip-flop circuits 15a and 15b correspond to the flip-flop circuit 15, in the first and second preferred embodiments, respectively. These elements form a toggle circuit. Although wiring through which an initial data is provided to the registers SUBH3 to SUBH0, and SUBV3 to SUBV0, is omitted in FIG. 4, an initial value is basically inputted to the foremost stage registers SUBH3 and SUBV3 from an external memory or the like, by direct memory access, etc.

Output terminals of the flip-flop circuits 15a and 15b taken as a pair, are connected to an AND circuit 24, OR circuit 25 and exclusive-OR circuit 26, in order to perform their respective logical operations. Output terminal Q of the flip-flop circuit 15a, the output terminal of the AND circuit 24, output terminal of the OR circuit 25 and output terminal of the exclusive-OR circuit 26 are connected to the selection input terminals of a four-terminal selector 27, respectively. The AND circuit 24, OR circuit 25 and exclusive-OR circuit 26 perform multiple logical operations. On the other hand, the part at which the output terminal Q of the flip-flop circuit 15a is inputted directly to the four-terminal selector 27, cancels the output of the flip-flop circuit 15b, and selects only the output of the flip-flop circuit 15a. Hence, these elements including the mentioned direct input, are hereinafter referred to as "a logical operation block."

Thus, the multiple shift registers 21a and 21b are disposed in parallel, and the output only from the flip-flop circuit 15a related to the shift register 21a, output from the AND circuit 24 performing AND operation for both, output from the OR circuit 25 performing OR operation for both, and output from the exclusive-OR circuit 26 performing exclusive OR operation for both, are selected by the four-terminal selector 27. Therefore, the four-terminal selector 27 can output a variety of values in combination with the output values from the flip-flop circuits 15a and 15b, depending on the value of the registers SUBH3 to SUBH0, and SUBV3 to SUBV0.

As shown in FIG. 4, in the case that the number of the registers SUBH3 to SUBH0, or registers SUBV3 to SUBV0 is four or more (for this case, the number of toggles is usually four), if it is desired to set the number of toggles (e.g., a fraction of the maximum number of toggles) less than the maximum number of toggles (it is four in FIG. 4), such setting cannot be attained with the configuration as shown in FIG. 1. When it is desired to realize the number of toggles less than the maximum number of toggles that is prepared as the number of registers, the loops of the shift registers 21a and 21b are divided into the number of stages for which no selection input is required, a comparison is made in the comparators 23a and 23b, and various logical operations are selectively carried out in the AND circuit 24 and OR circuit 25, thereby any number of pulses can be generated in a cycle. As a result, the number of toggles per cycle, which is less than the number of the disposed registers, can be easily obtained as in the second preferred embodiment. It should be noted that it is rare for the drive pulse of a CCD to employ odd toggles in a cycle, and therefore, the number of stages divided is preferably in four-stage units, however, it may be three-stage units.

With the foregoing configuration, there is the advantage of omitting selectors (see reference numerals 17a and 17b in FIG. 3), as compared to the second preferred embodiment. It will be recalled that in the third preferred embodiment a plurality of arithmetic circuits 24 to 26, and the four-terminal selector 27 are added to the output part of the circuit, when compared to the second preferred embodiment. However, it is easier to design such that signals are synthesized at the time pulses are generated in the flip-flop circuits 15a and 15b, than that the selectors (see reference numerals 17a and 17b in FIG. 3) or the like are disposed in the shift registers (see reference numerals 12a and 12b in FIG. 3). Accordingly, the shift registers 21a and 21b can be formed in a small area, resulting in a smaller circuit size as a whole. In addition, there is no need to write a timing data to the non-used registers in the loop of the shift registers 21a and 21b. This enables to reduce the time required for limitation.

Fourth Preferred Embodiment

Figure 5:
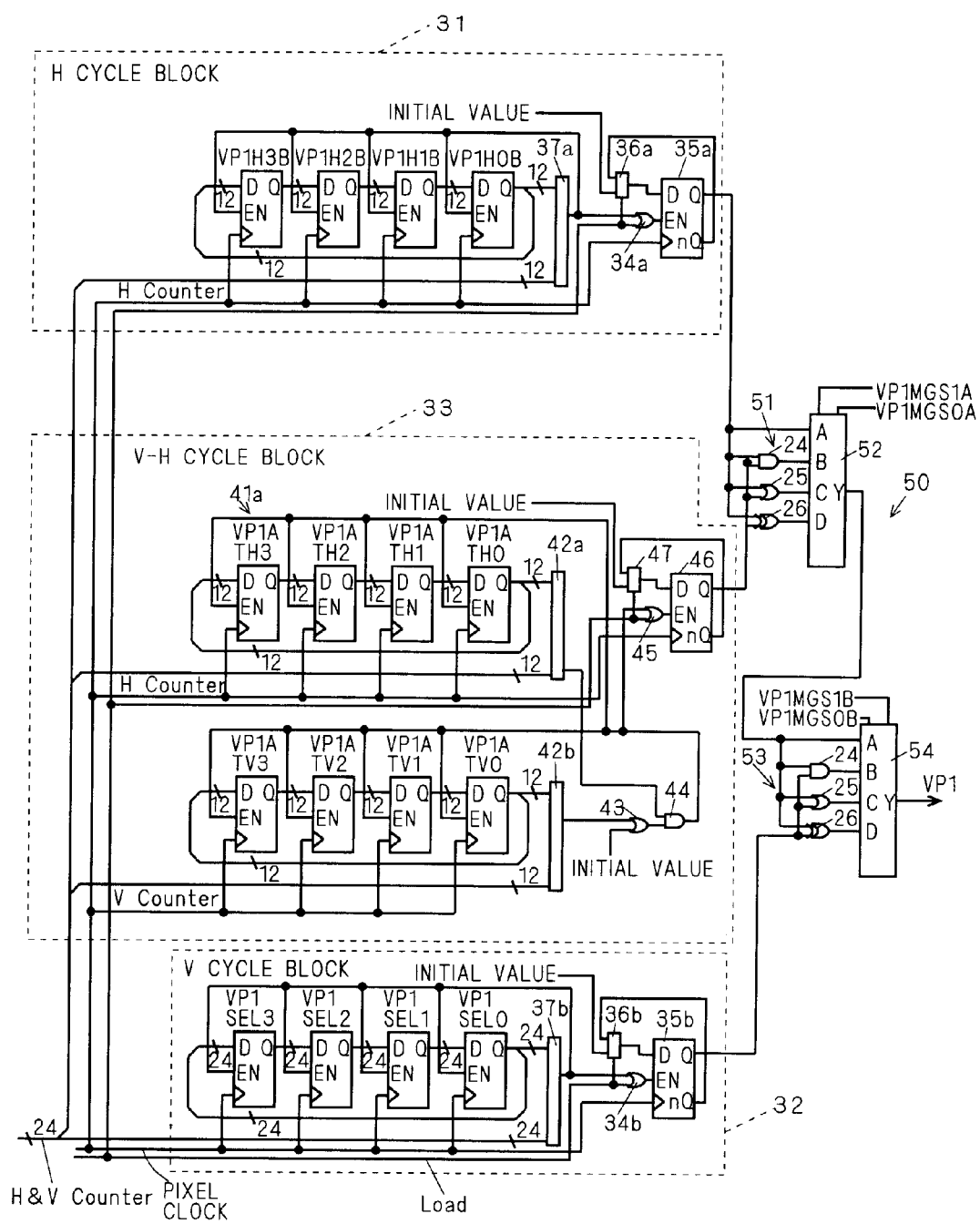
FIG. 5 is a block diagram of a timing generator of an image input device according to a fourth preferred embodiment.

FIG. 5 is a diagram illustrating a timing generator of a digital still camera, according to a fourth preferred embodiment. This timing generator involves an improvement in the configuration of the third preferred embodiment. Specifically, in addition to a H cycle block 31 that generates toggles of a repeat pattern only with respect to a horizontal cycle, a V cycle block 32 that generates toggles of a repeat pattern only with respect to a vertical cycle, there is provided a V-H cycle block 33 that performs a pulse output in full range in synchronization with these blocks 31 and 32, and provides signals used for logical operations between these blocks 31 and 32. Thereby, any repeat pattern can be generated by selectively connecting the V-H cycle block 33 to the block 31 or 32.

Here, the vertical (V) cycle means a full cycle, and therefore, any number of bits is prepared so as to process signal residing at any position in image. On the other hand, the horizontal (H) cycle is a repeat pattern in a horizontal line, and all required is to specify the position of the horizontal line, however, it is necessary to set the number of bits such as to be repeated per horizontal cycle. This might produce a difference in the number of bits between the H cycle block 31 and V cycle block 32. In order that the V-H cycle block 33 can cope with the V cycle block 32, the block 33 has comparative positions covering all the bits of the count values of horizontal and vertical synchronizing frequency signals (H count and V count), so as to make a comparison with the count value of all pixel data. Logical operations can be carried out easily in combination with the H cycle block 31.

In the H cycle block 31 of the fourth preferred embodiment, registers VP1H3B to VP1H0B correspond to the registers SUBH3 to SUBH0 in FIG. 4, respectively. An OR-circuit 34a corresponds to the OR circuit 14a in FIG. 4, a flip-flop circuit 35a corresponds to the flip-flop circuit 15a in FIG. 4, and a selector 36a corresponds to the selector 16a in FIG. 4. These form a toggle circuit. A comparator 37a corresponds to the comparator 23a in FIG. 4.

In the fourth embodiment registers VP1SEL3 to VP1SEL0, OR circuit 34b, flip-flop circuit 35b, selector 36b and comparator 37b in the V cycle block 32 are disposed so as to correspond to registers VP1H3B to VP1H0B, OR circuit 34a, flip-flop circuit 35a, selector 36a and comparator 37a in the H cycle block 31, respectively.

The V-H cycle block 33 has a shift register 41a of a loop structure that has a short cycle (horizontal cycle), and a shift register 41b of a loop structure that has a cycle of the second power of the short cycle (vertical cycle). The comparator of the shift register 41b for a long cycle is divided into two: a comparator 42a having short cycle bits; and a comparator 42b having long cycle bits. The output of the comparator 42b having upper bits is selectively forced to be turned on by a control signal (force V-enable) from the exterior.

Specifically, in the V-H cycle block 33, the shift register 41a of a loop structure for shifting a toggle timing data in a horizontal address (registers VP1ATH3 to VP1ATH0) and the shift register 41b of a loop structure for shifting a toggle timing data in a vertical address (registers VP1ATV3 to VP1ATV0) are disposed in parallel relationship. The comparator 42a compares the output from the shift register 41a for horizontal cycle with the count value of a horizontal synchronizing frequency signal (H count). The comparator 42b compares the output from the shift register 41b for vertical synchronization, with the count value of a vertical synchronizing frequency signal (V count). The output value of the comparator 42b that makes an address comparison with respect to the vertical direction is inputted to the OR circuit (forced circuit) 43 for a logical operation with a predetermined control signal (force V-enable) from the exterior. The output value from the OR circuit 43 and the output value from the comparator 42a that makes an address comparison with respect to the horizontal direction, are inputted to the AND circuit 44 for AND operation. The result is inputted to a toggle circuit formed by the OR circuit 45, flip-flop circuit 46 and selector 47. The mentioned predetermined control signal (force V-enable) that is fed to the OR circuit (forced circuit) 43 from the exterior, is one with which the OR circuit (forced circuit) 43 is forced to be high state, irrespective of the output value of the comparator 42b. Thereby, when a control signal (force V-enable) is in high state, the output from the comparator 42a is outputted, as it is, directly from the AND circuit 44.

Thus, the V-H cycle block 33 is arranged to carry out a logical product operation between the shift register 41a that has the same loop structure as the interior of the H cycle block 31 (the registers VP1ATH3 to VP1ATH0), and the shift register 41b that has the same loop structure as the interior of the V cycle block 32 (the registers VP1ATV3 to VP1ATV0). Therefore, a logical operation in a predetermined logical circuit group 50 can be carried out easily in combination with the H cycle block 31 or V cycle block 32. This facilitates to generate any complicated toggle pulse.

FIG. 5 gives an example of the logical circuit group 50. This is composed of a logical operation block 51 comprising an AND circuit 24, OR circuit 25, and exclusive-OR circuit 26 which are similar to that shown in FIG. 4 (the third preferred embodiment); a selector 52 that selects the output from the circuits 24 to 26 of the logical operation block 51, and the output from a H cycle block 31; a logical operation block 53 comprising an AND circuit 24, OR circuit 25, and exclusive-OR circuit 26 which are similar to that shown in FIG. 4 (the third preferred embodiment); and a selector 54 that selects the output from the circuits 24 to 26 of the logical operation block 52, and the output from the selector 52. It should be understood that the logical configuration is not limited to that shown in FIG. 5, and various configurations are adaptable.

Figure 6:
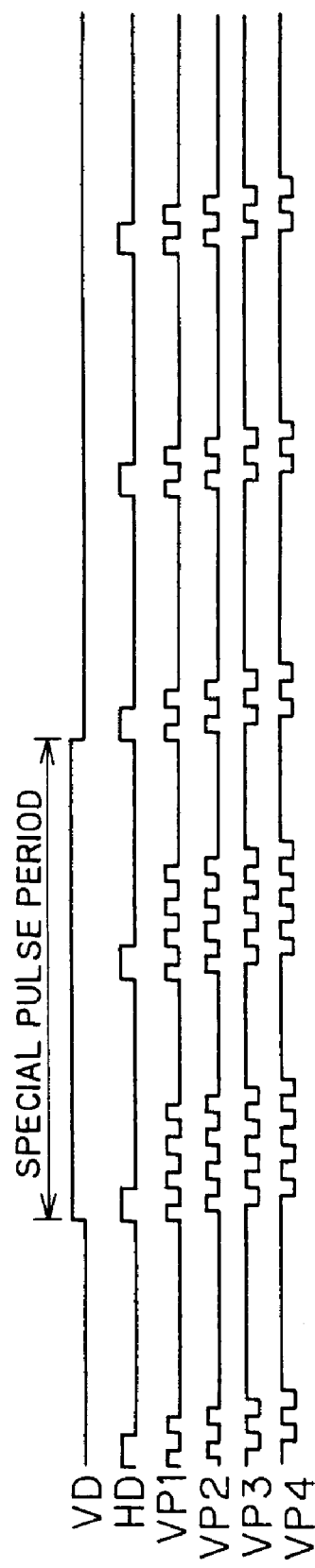
FIG. 6 is a diagram illustrating one example of waveforms outputted from blocks of the timing generator in the fourth preferred embodiment.
Figure 7:
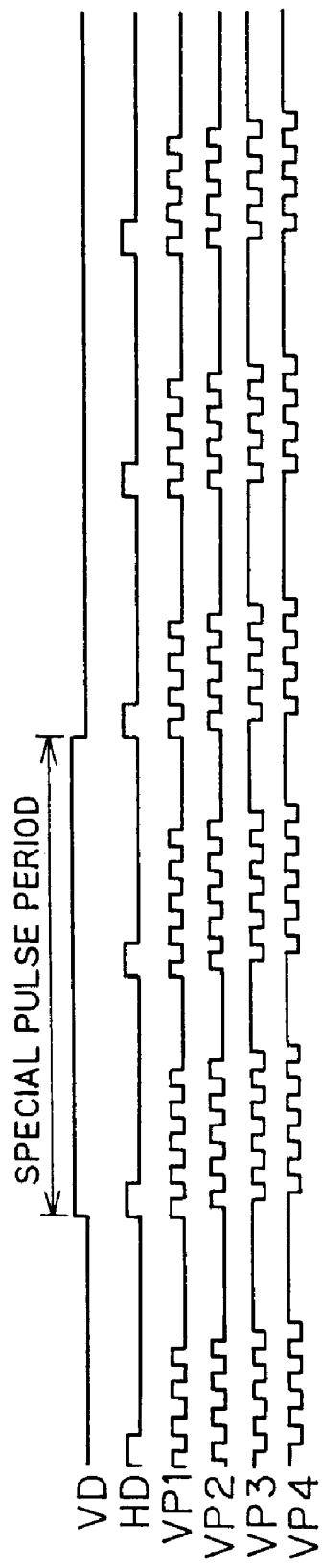
FIG. 7 is a diagram illustrating other example of waveforms outputted from blocks of the timing generator in the fourth preferred embodiment.

FIGS. 6 and 7 give an example of waveforms outputted from each part when the above circuit configuration is employed.

In generating a vertical transfer pulse (V pulse) of the drive pulse of a CCD, there are usually required a pulse that occurs a given number of times during a horizontal cycle, and a special pulse that occurs for a short period during a vertical cycle (symbol VD in FIGS. 6 and 7). In general, a great number of combinations of the number of pulses in a horizontal cycle (symbol HD in FIGS. 6 and 7) and the number of toggles of a special pulse (VD), exist per CCD to be incorporated in a digital camera. In order to provide a timing generator which is programmable such as to drive a variety of CCDs, various pulse waveforms are required depending on the type of CCD. For instance, there exists a CCD having a drive pattern in which the number of V pulses differs from one line (a horizontal cycle) to another. In this connection, it is required in some cases an extremely complicated pulse waveform as shown in FIG. 6. With this preferred embodiment, any complicated pulse waveform can be generated easily by using the V-H cycle block 33 in addition to the H cycle block 31 and V cycle block 32, and selecting the horizontal or vertical function of the V-H cycle block 33, depending on the type of CCD. In FIGS. 6 and 7, symbols VD, HD, and VP1 to VP4 designated a vertical synchronizing pulse, horizontal synchronizing frequency signal, and vertical transfer pulse, respectively. As can be readily seen by comparison of FIG. 6 with FIG. 7, there can exist variations in the pulse signal required for CCDs which are of different specifications. It is easy for the timing generator of this preferred embodiment to deal both patterns in FIGS. 6 and 7.

As a method of generating such a complicated pulse, a pulse generating circuit may be designed per CCD, alternatively, the number of registers may be increased in response to the maximum number of horizontal pulses. As compared to these methods, with this preferred embodiment, a variety of pulse waveforms can be generated easily on a single circuit in a small circuit size, thereby reducing circuit size and thus providing a timing generator excellent in versatility.

Fifth Preferred Embodiment

Figure 8:
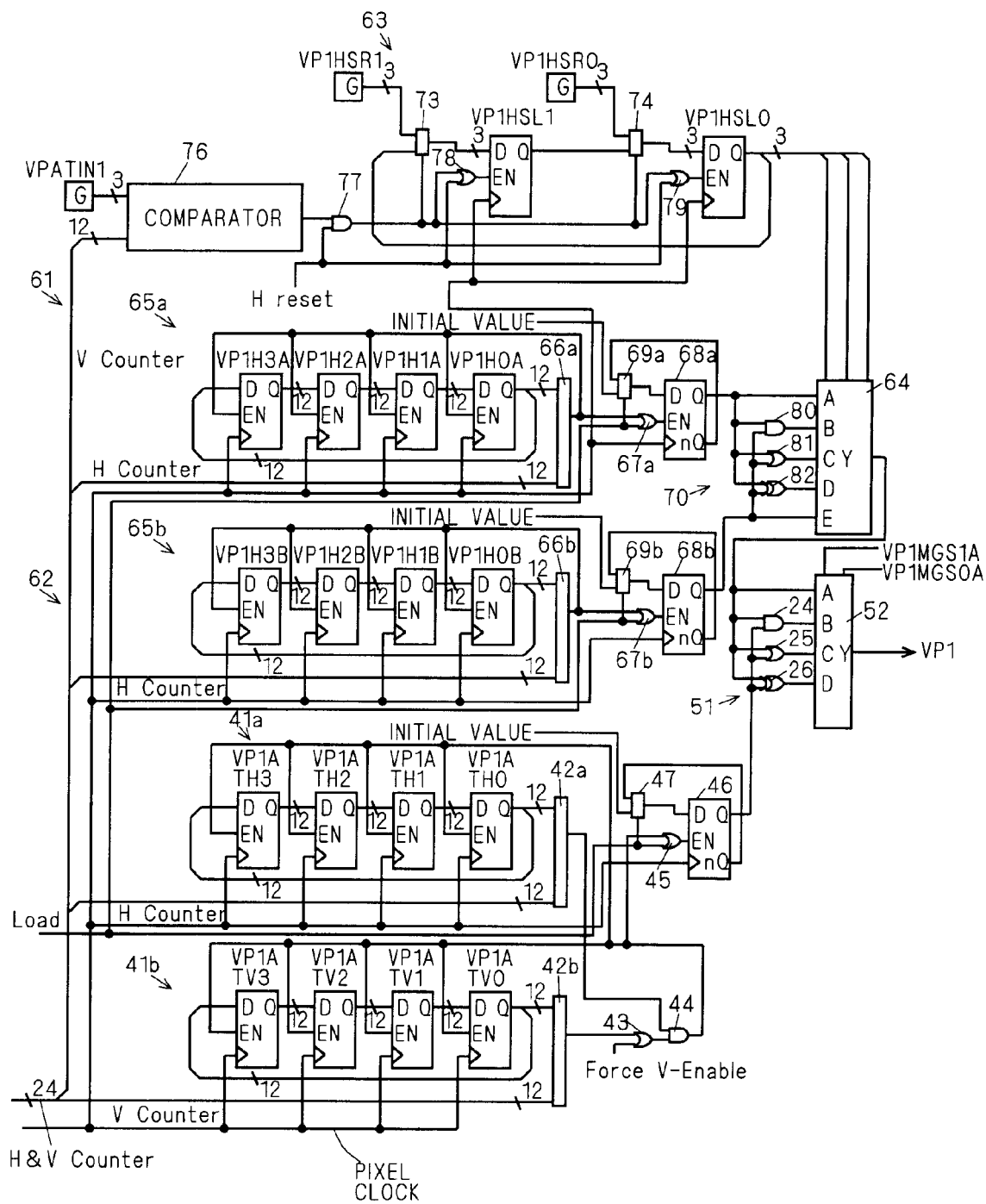
FIG. 8 is a block diagram illustrating a timing generator of an image input device according to a fifth preferred embodiment.
Figure 9:
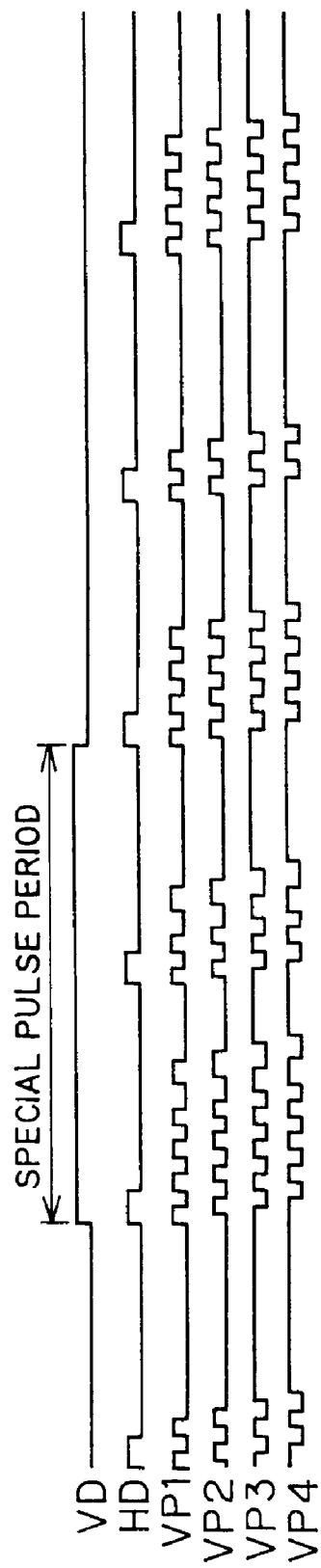
FIG. 9 is a diagram illustrating one example of waveforms outputted from blocks of the timing generator in the fifth preferred embodiment.
Figure 10:
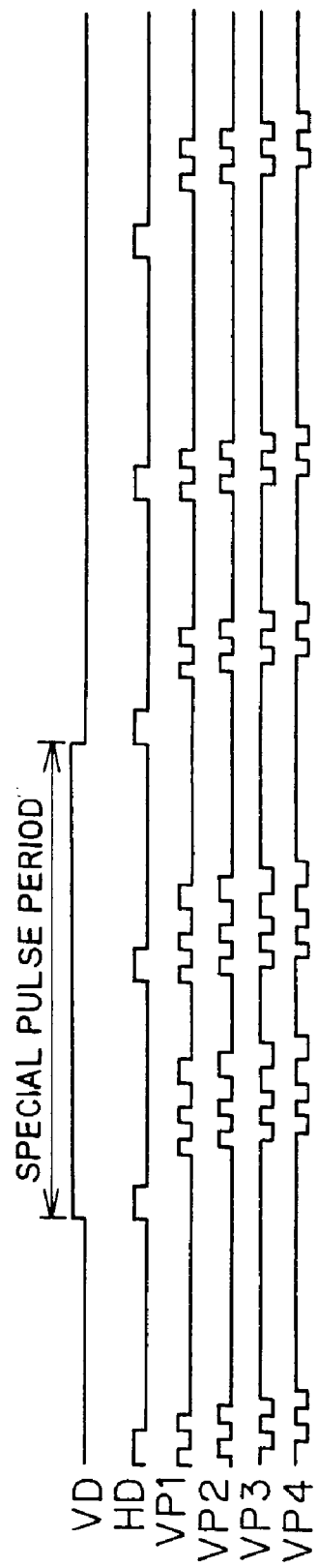
FIG. 10 is a diagram illustrating other example of waveforms outputted from blocks of the timing generator in the fifth preferred embodiment.

FIG. 8 is a block diagram illustrating a timing generator of a digital still camera, according to a fifth preferred embodiment. FIG. 9 gives an example of horizontal repeat pulses. FIG. 10 gives other example of horizontal repeat pulses. This timing generator involves an improvement in the configuration of the fourth preferred embodiment. In FIG. 8, the same elements as the fourth preferred embodiment have similar reference numerals, but a V cycle block 32 is omitted herein.

As shown in FIGS. 9 and 10, some digital still cameras require various irregular symbolic waveforms, depending on the type of CCD mounted. The circuit of this preferred embodiment, as shown in FIG. 8, is configured so as to meet the demands for irregular symbolic waveforms as shown in FIGS. 9 and 10.

Referring to FIG. 8, this timing generator has two H cycle blocks 61 and 62, in place of the H cycle block 31 of the fourth preferred embodiment; a logical operation circuit block 70 that can perform multiple kinds of logical operations about a combination of the output values of the H cycle blocks 61 and 62; a selector 64 that selects the kind of a logical operation executed in the logical operation circuit block 70; and a selection determining block 63 in which a combination of these elements used for logical operation is selected by switching the selector 64 per horizontal line.

The H cycle blocks 61 and 62 are of similar configuration to the H cycle block 31 of the fourth preferred embodiment. These are provided with shift registers 65a and 65b of a loop structure which are formed by a plurality of registers VP1H3A to VP1H0A, and VP1H3B to VP1H0B, respectively; comparators 66a and 66b which are connected to the rearmost stage registers VP1H0A and VP1H0B of their respective shift registers 65a and 65b, to make a comparison with the count value of a horizontal synchronizing frequency signal (H count); and toggle circuits which are formed by OR circuits 67a and 67b, flip-flop circuits 68a and 68b, and selectors 69a and 69b, respectively.

The selection determining block 63 is configured as a shift register of two-stage loop structure using two registers VP1HSL1 and VP1HSL0. In the block 63 it is arranged that, upon receipt of a predetermined enable signal (EN), signals selected by selectors 73 and 74 are inputted as an input signal D. The front selector 73 can select an initial value VP1HSR1 supplied from the exterior, and output Q from the rear stage register VP1HSL0. The rear selector 74 can select output Q from the preceding register VP1HSL1, and an initial value VP1HSR0 supplied from the exterior. These selectors 73 and 74 are configured to be switched to the initial value VP1HSR1 and VP1HSR0, respectively, based on a reset signal (H reset) supplied from the exterior. Thereby, even if the number of horizontal lines of a CCD is odd, selection of the selector 64 is easily initialized even at an odd timing. In the registers VP1HSL1 and VP1HSL0, therefore, not only the shift signal provided from a predetermined circuit (the comparator 76 and AND circuit 77), but also the reset signal (H reset) that is obtained from the exterior through the OR circuits 78 and 79, is received as an enable signal (EN).

The logical operation circuit block 70 has an AND circuit 80 that carries out a logical product operation of the output values of the H cycle blocks 61 and 62; an OR circuit 81 performing OR operation of these output values; and an exclusive-OR circuit 82 performing an exclusive OR operation of these output values. These elements are of similar configuration to the logical operation block 51. Any logical operator may be disposed in addition to these circuits, alternatively, in place of a certain circuit of these.

The selector 64 can select arbitrarily the output from circuits 80 to 82 of the logical operation circuit block 70, and the output from the H cycle blocks 61 and 62.

Thus, the logical operation circuit block 70 carries out AND operation or OR operation of the outputs of at least two H cycle blocks 61 and 62 of a loop structure, alternatively, only the output of the block 61 or 62 can be selected. In particular, thanks to the selection determining block 63, the kind of logical operation can be changed freely per horizontal line. This enables to generate a variety of complicated pulses, as shown in FIGS. 9 and 10, in a small circuit size.

Sixth Preferred Embodiment

Figure 11:
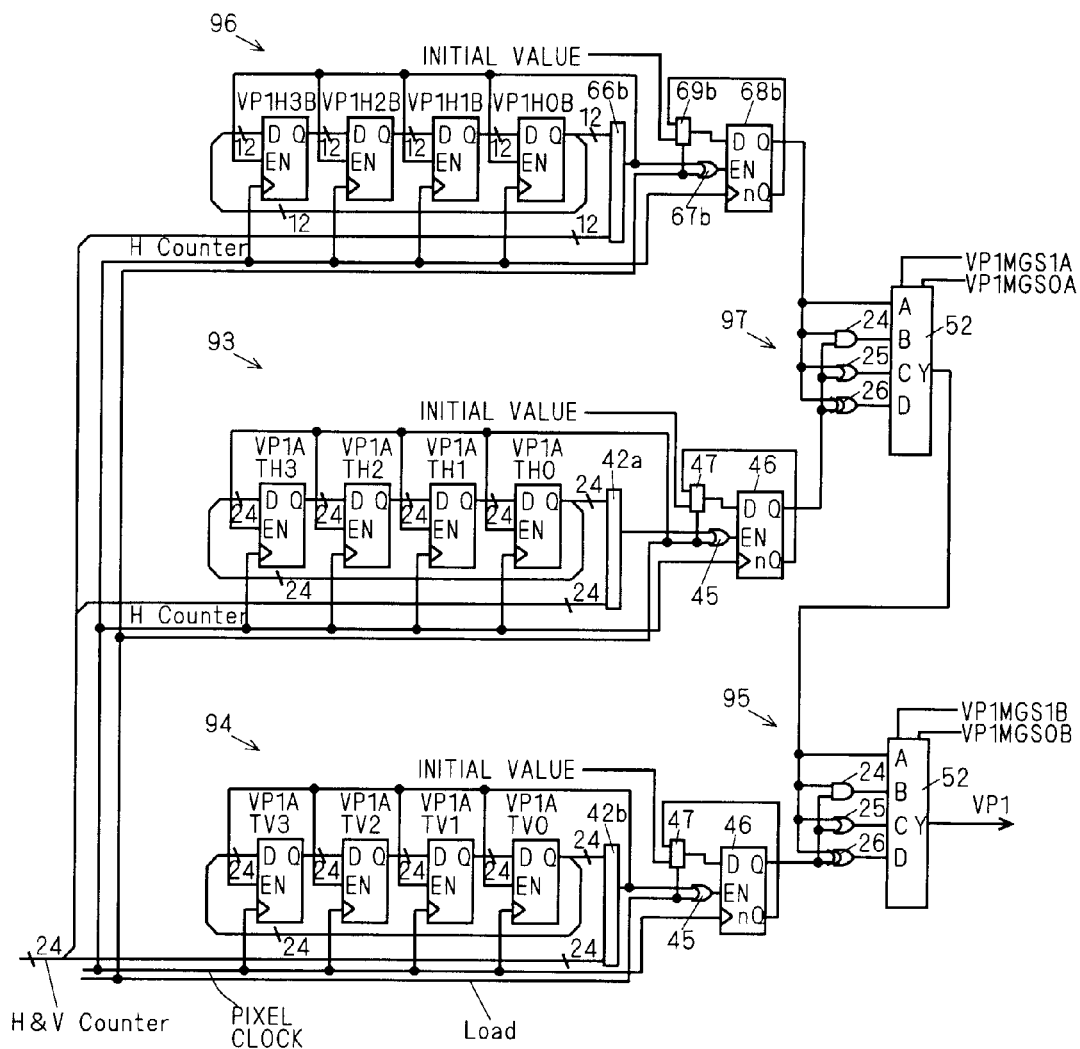
FIG. 11 is a block diagram illustrating a timing generator of an image input device according to a sixth preferred embodiment.
Figure 12:
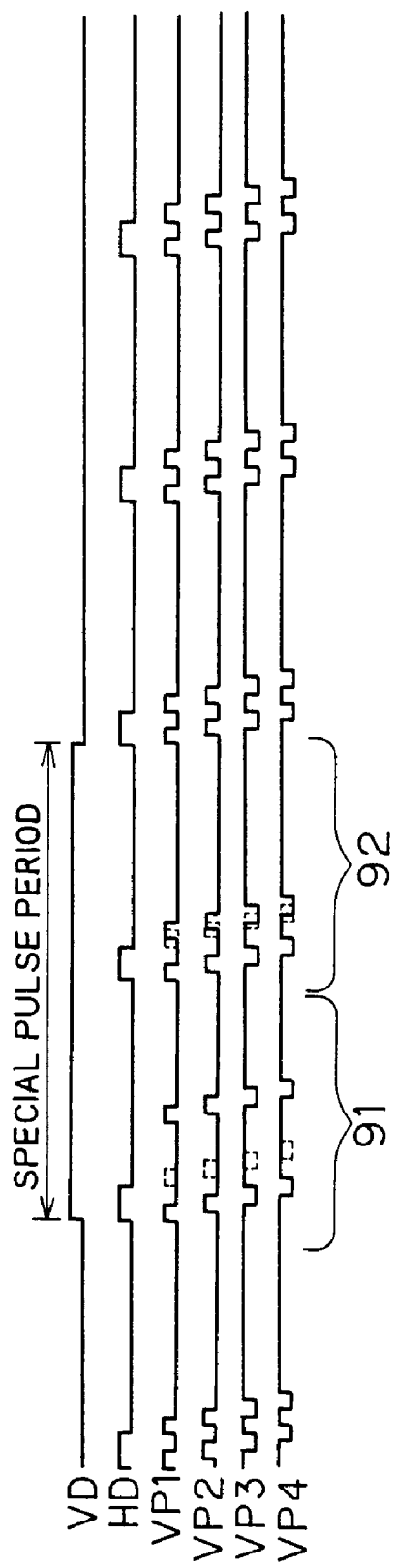
FIG. 12 is a diagram illustrating one example of waveforms outputted from blocks of the timing generator in the sixth preferred embodiment.
Figure 13:
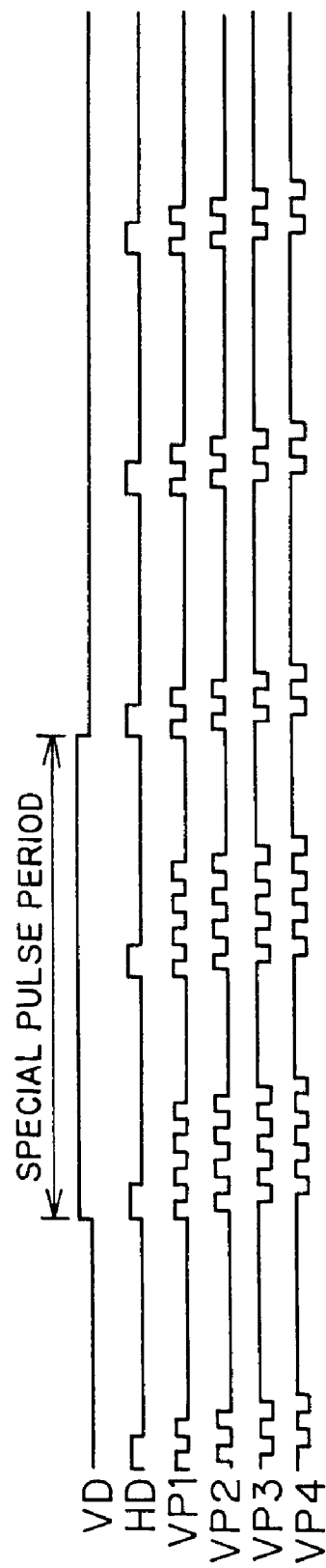
FIG. 13 is a diagram illustrating other example of waveforms outputted from the blocks of the timing generator in the sixth preferred embodiment.

FIG. 11 is a block diagram illustrating a timing generator of a digital still camera, according to a sixth preferred embodiment. FIG. 12 gives an example of horizontal repeat pulses. FIG. 13 gives other example of horizontal repeat pulses. This timing generator involves an improvement in the configuration of the fifth preferred embodiment. In FIG. 11, the same elements as the fifth preferred embodiment have similar reference numerals.

As shown in FIGS. 12 and 13, some digital still cameras require various irregular symbolic waveforms, depending on the type of CCD mounted. The circuit of this preferred embodiment, as shown in FIG. 12, is configured by using a so-called "cascade connection", in order to meet the demands for such a waveform in which the timing of individual pulse itself occurs irregularly, as shown in FIG. 12.

In general, when using a specific CCD, there are, as indicated by reference numerals 91 and 92, two or more kinds of pulses during a horizontal cycle, and the output position of pulse moves in a horizontal cycle in some cases. The pulse of this type can be generated with, for example, a software program processing by a CPU, by arranging that another set of pulse generating circuit is added to the line causing a reduction in the number of pulses, for selective switching. With this method, however, the number of registers and circuits are magnified two times or more.

In this connection, the timing generator of this preferred embodiment has two sets of full-range pulse change circuits 93 and 94, as shown in FIG. 11, so that the pulse change circuit (first pulse change circuit) 93 carries out a cascaded logical operation with respect to a horizontal cycle pulse generating circuit 96, and that the output result of these logical operations and the output of the other pulse change circuit (second pulse change circuit) 94 are subjected to various logical operations in a logical operation circuit 95.

Specifically, if it is desired two kinds of patterns of different irregular timing as shown in FIG. 12, one pattern (a first pattern) can be generated on a horizontal cycle pulse generating circuit 96, and a horizontal pulse from the horizontal cycle pulse generating circuit 96 can be masked in a first logical operation circuit block 97, by using a full-range pulse from the preceding first pulse change circuit 93. In FIG. 12, broken lines indicate pulses masked by the first logical operation circuit block 97. By using a full-range pulse from the following second pulse change circuit 94, a new pulse is added to part of the masked pulse signal.

Since the two full-range pulse change circuits 93 and 94 can be used at the same time, logical operations in the logical operation circuit blocks 95 and 97 are switched by the selector 52. This enables to sufficiently cope with any CCD which is required to have other special pulse as shown in FIG. 13.

The internal configuration of the pulse change circuits 93 and 94, and the horizontal cycle pulse generating circuit 96 is of similar configuration to the H cycle blocks 61 and 62 of the fifth preferred embodiment shown in FIG. 8, and therefore, description thereof is omitted herein.

Thus, three blocks having a shift register of a loop structure are disposed in a cascade connection. One block of these is used for horizontal cycle (short cycle), and the remaining two blocks are used for full-range pulse change. With this configuration, it is possible to output a variety of pulse waveform signals and increase sharply versatility as a single timing generator.

Seventh Preferred Embodiment

Figure 14:
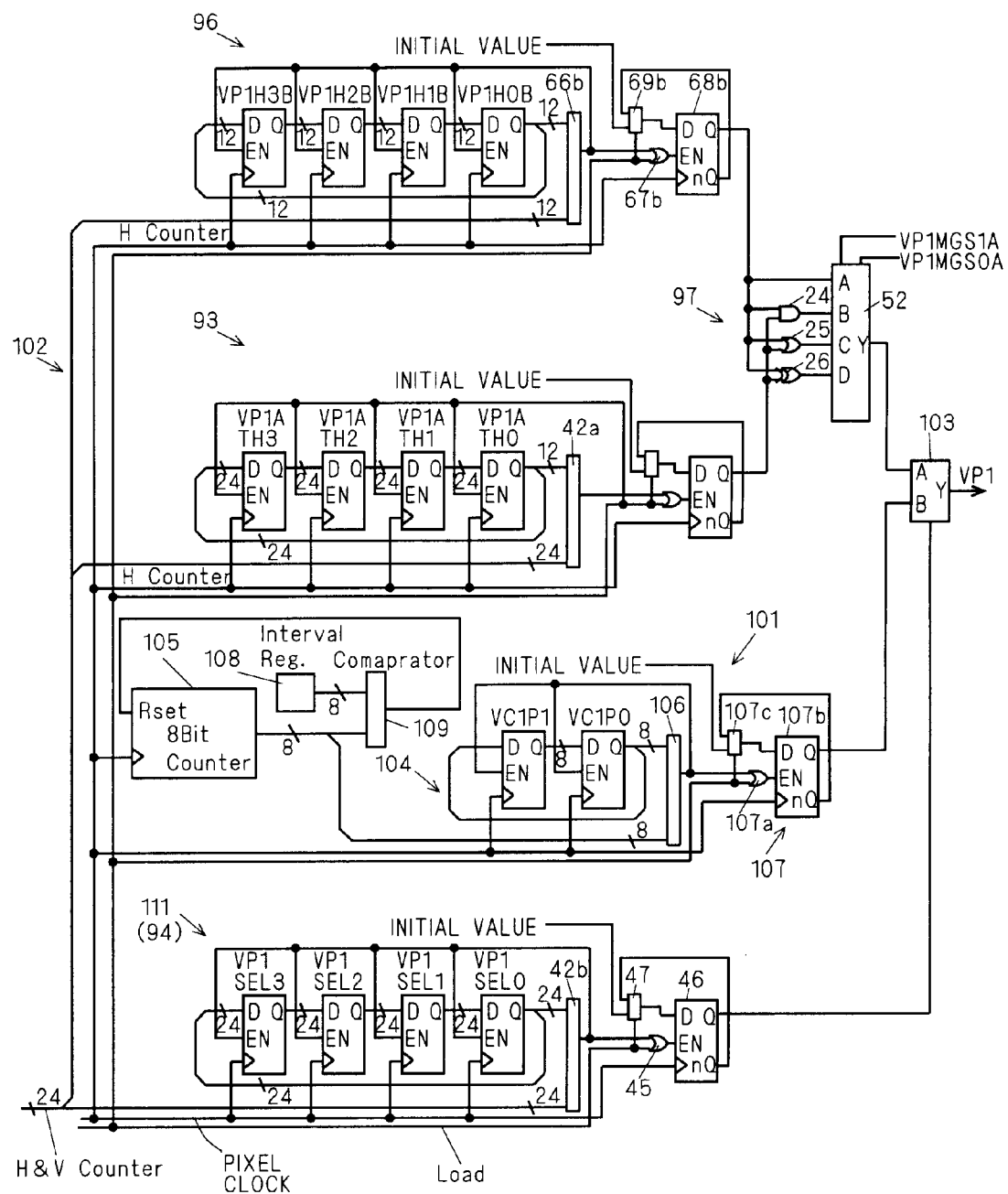
FIG. 14 is a block diagram illustrating a timing generator of an image input device according to a seventh preferred embodiment.
Figure 15:
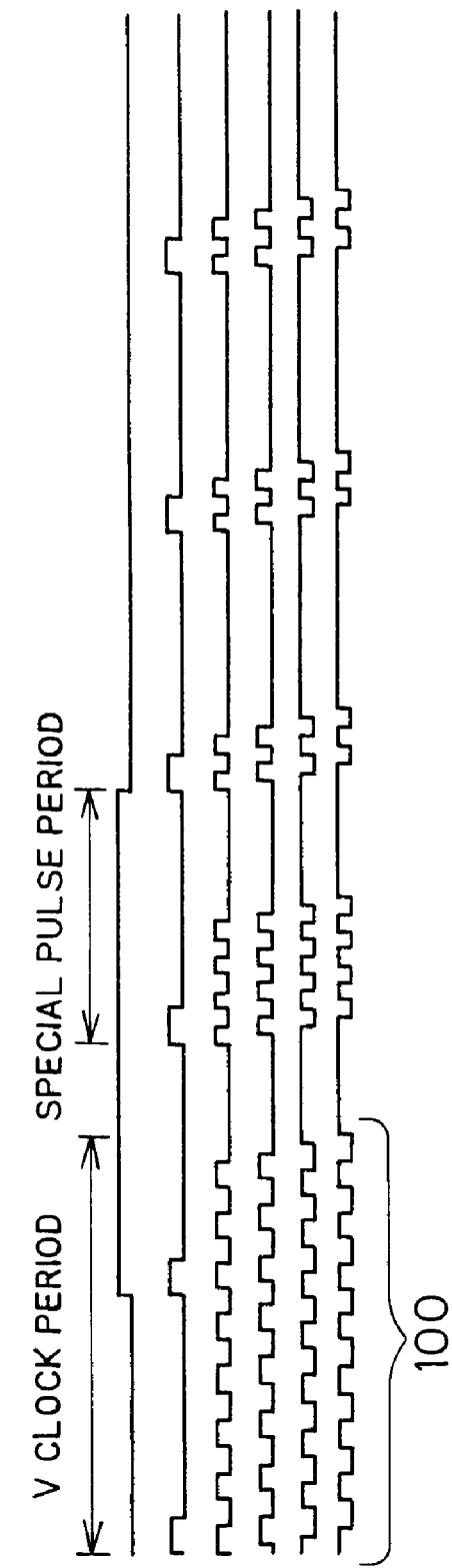
FIG. 15 is a diagram illustrating one example of waveforms outputted from blocks of the timing generator in the seventh preferred embodiment.

FIG. 14 is a block diagram illustrating a timing generator of a digital still camera, according to a seventh preferred embodiment. FIG. 15 gives an example of horizontal repeat pulses. This timing generator involves an improvement in the configuration of the sixth preferred embodiment shown in FIG. 11. In FIG. 14, the same elements as the sixth preferred embodiment have similar reference numerals.

Consider now a read time reduction in the full pixel read operation of a specific CCD, such as an interlace read CCD. Some CCD is required to apply continuously several hundreds of V pulses, as shown by reference numeral 100 in FIG. 15, in order to clear the residual charge in a charge transfer block of the CCD. In this connection, such a continuous pulse can be generated readily by disposing registers necessary to ensure several hundreds of toggle timings. This manner, however, will greatly increase circuit size.

Whereas in this preferred embodiment, it is arranged that a continuos clock generating block 101 that generates a continuous clock pulse as indicated by reference numeral 100 in FIG. 15, and a pulse generating circuit 102 that generates a horizontal repeat pulse as described in the foregoing preferred embodiments, are selectively switched by a selector 103.

The continuous clock generating block 101 comprises a shift register 104 that has two registers VC1P1 and VC1P0 forming a two-stage loop structure; a counter 105 counting pixel clocks; a comparator 106 that compares the count signal from the counter 105 with the output signal from the shift register 104; and a toggle circuit 107 that toggles based on the output from the comparator 106.

The count cycle of the counter 105 is defined by an interval register 108. A comparator 109 compares the output from the interval register 108 with the output from the counter 105, in order that the counter 105 is operated in a cycle of a given number of pixels.

The toggle circuit 107 comprises an OR circuit 107a, flip-flop circuit 107b and selector 107c. Toggle is repeated when an enable signal (EN) is provided to the flip-flops circuit 107b.

The selector 103 carries out switching between the output from the continuous clock generating block 101 and the output from the pulse generating circuit 102 (selector 52), at a desired timing that is based on the output from a full cycle pulse generating block 111 of similar configuration to the second pulse change circuit 94 in the sixth preferred embodiment.

With this configuration, the comparator 106 compares the output from the counter 105 with the output from the counter 106 and, based on the result of comparison, outputs a continuous clock signal (V clock). Based on the clock signal, the toggle circuit 107 repeats a toggle operation. The selector 103 selects the pulse signal from the toggle circuit 107 and the pulse signal related to a horizontal cycle which is supplied from the selector 52, for outputting as an output signal VP1.

By virtue of that the selector 103 carries out a selective switching between the continuous clock generating block 101 generating a continuous clock signal, and the pulse generating circuit 102 generating a horizontal repeat pulse, the circuit part generating a continuous clock can be realized in an extremely small scale, and a great number of pulses can be generated arbitrarily.

Figure 16:
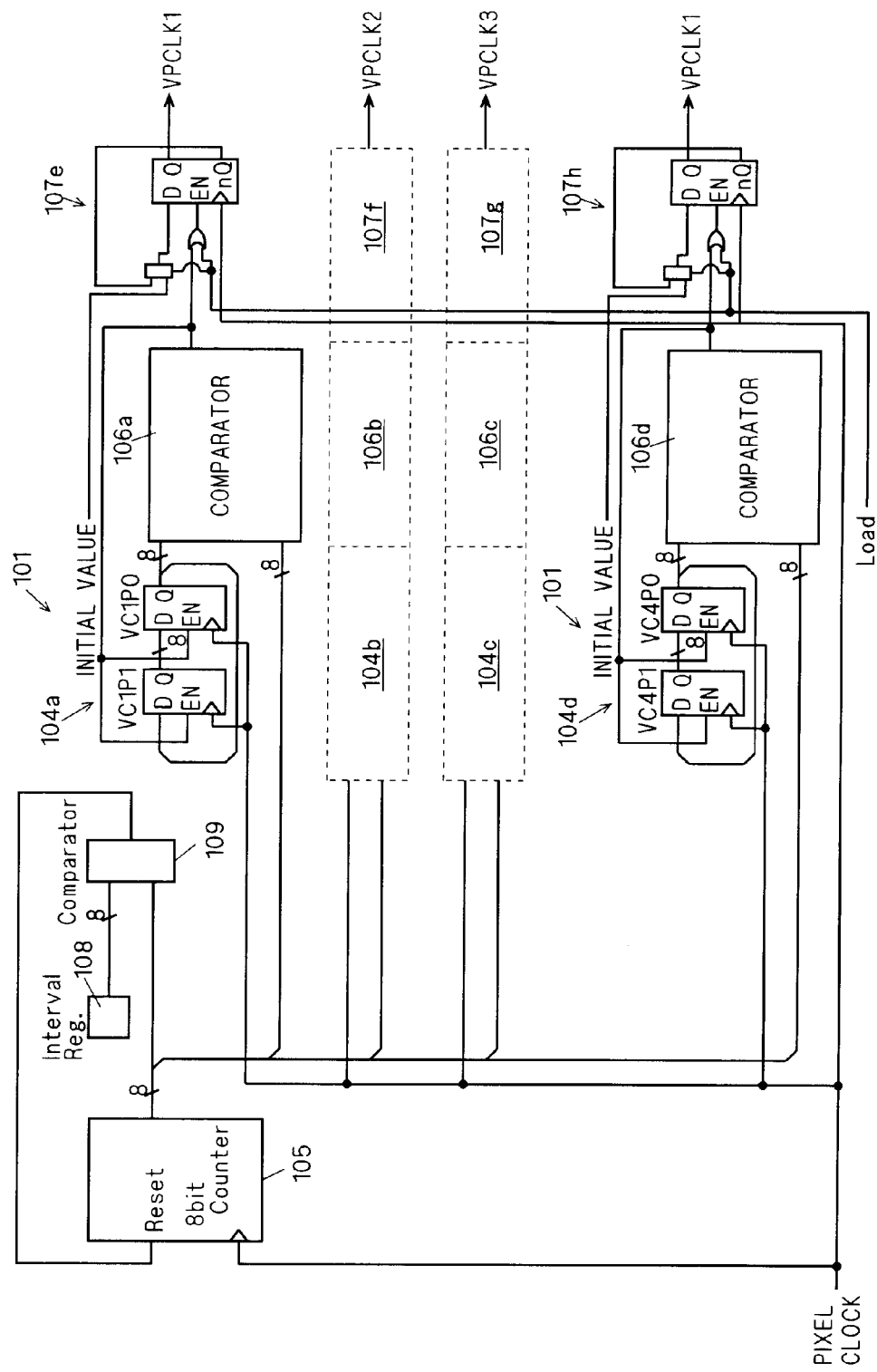
FIG. 16 is a diagram illustrating the timing generator of the first preferred embodiment.

The foregoing description has been made of the continuous clock generating block 101 having only one shift register 104, comparator 106 and toggle circuit 107. Alternatively, as shown in FIG. 16, multiple shift registers 104a to 104d, multiple comparators 106a to 106d and multiple toggle circuits 107e to 107h may be disposed so as to perform switching between the signals from the respective toggle circuits 107e to 107h, and between multiple pulse generating circuits.

Modifications

Figure 17:
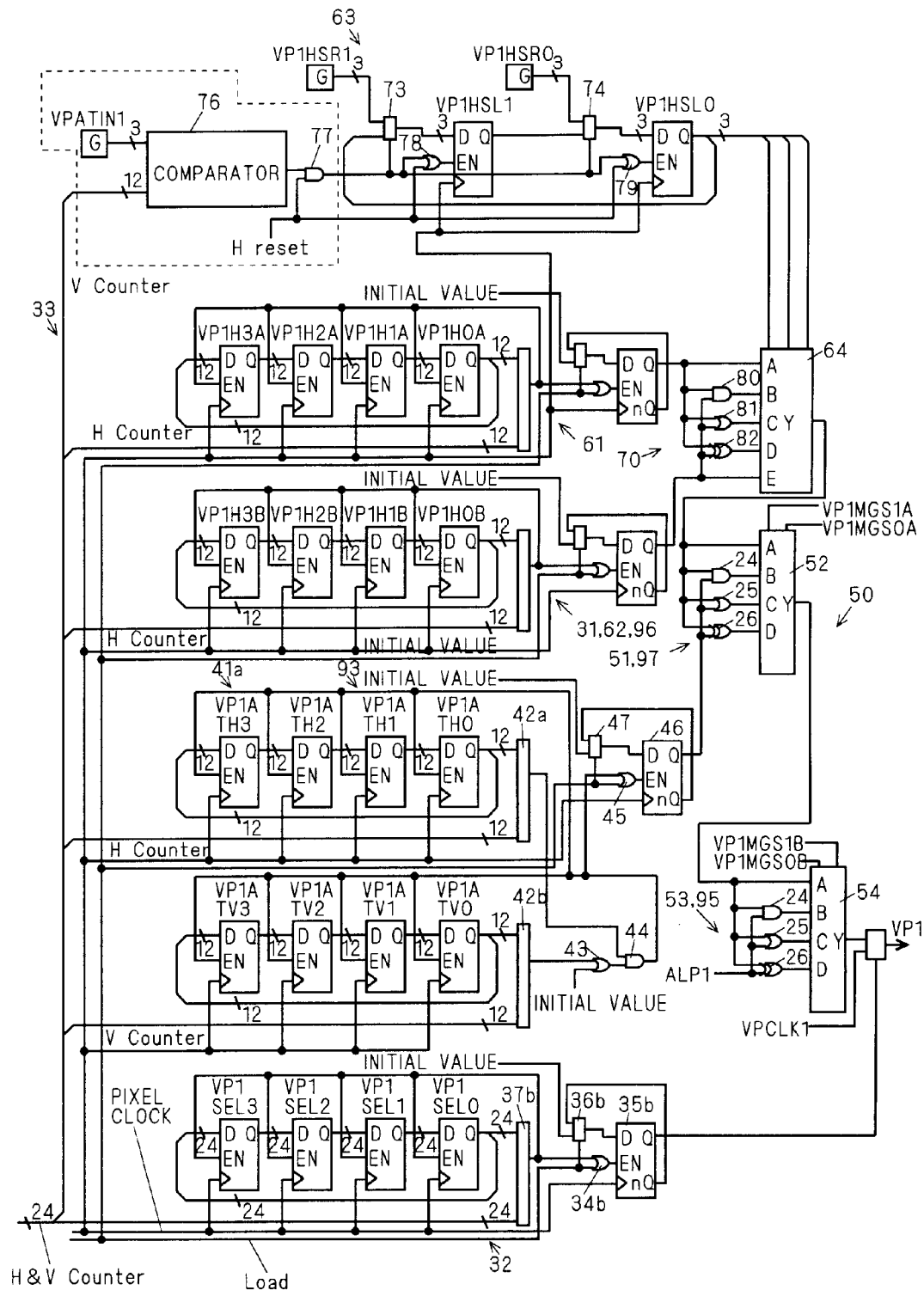
FIG. 17 is a diagram illustrating a modification of the timing generator of an image input device according to the present invention.

FIG. 17 gives the circuit configuration of a modification. The timing generator of FIG. 17 is formed, as a single circuit, in combination with the fourth preferred embodiment (FIG. 5), the fifth preferred embodiment (FIG. 8) and the sixth preferred embodiment (FIG. 11). In FIG. 17, the same elements as these preferred embodiments have similar reference numerals. That is, the configuration of the shift registers of a loop structure on the pulse generating circuit, comparators, and toggle circuit, are basically common to all the foregoing preferred embodiments. Therefore, if it is desired to select all of these functions within the circuit, the circuit configuration is simplified by arranging so that these circuit operations are selected by selectors 52, 54 and 56, without disposing circuits separately. That is, when versatility is improved by applying various functions, no complication in circuit configuration occurs. This allows to utilize the circuit area efficiently, and thus contributes to less power consumption.

This timing generator has its principal object to drive an image pickup element of a digital still camera, it is, of course, adaptable to any equipment using a different image pickup device.

While the invention has been shown and described in detail, the foregoing description is in all aspects illustrative and not restrictive. It is therefore understood that numerous modifications and variations can be devised without departing from the scope of the invention.

What is claimed is:

1. A timing generator of an image input device which regulates a read timing in reading a pixel data from an image pickup device of said image input device, said timing generator comprising:

a shift register having a plurality of registers so as to form a loop structure by which the output from the rearmost stage register is inputted to the foremost stage register;

a comparator that compares the output from said shift register with the count value of a horizontal frequency signal or vertical frequency signal; and a toggle circuit that repeats a toggle operation based on the output signal from said comparator.

2. The timing generator according to claim 1 wherein said toggle circuit has a selector for inputting an initial value when a toggle operation is reset.

3. The timing generator according to claim 1 wherein a selector selecting a toggle timing data stored in an external main memory and the output from said rearmost stage register, is connected to said foremost stage register of said shift register.

4. The timing generator according to claim 1 wherein, when the number of registers in said shift register is more than three, a selector is connected to a data input terminal of an intermediate stage register in said shift register; and the output from the rearmost stage register is inputted to not only the foremost stage register but also said intermediate stage register through said selector connected to said data input terminal of said intermediate stage register.

5. A timing generator of an image input device which regulates a read timing in reading a pixel data from an image pickup device of said image input device, said timing generator comprising:

a first shift register having a plurality of registers so as to form a loop structure by which the output from the rearmost stage register is inputted to the foremost stage register;

a first comparator that compares the output from said first shift register with the count value of a horizontal frequency signal or vertical frequency signal;

a first toggle circuit that repeats a toggle operation based on the output signal from said first comparator;

a second shift register that is disposed in parallel with said first shift register, having a plurality of registers to form a loop structure by which the output from the rearmost stage register is inputted to the foremost stage register;

a second comparator that compares the output from said second shift register with the count value of a horizontal frequency signal or vertical frequency signal;

a second toggle circuit that repeats a toggle operation based on the output signal from said second comparator;

a logical operation block that performs predetermined multiple logical operations of the output from said first toggle circuit and the output from said second toggle circuit; and a selector that selects one of said multiple logical operations performed in said logical operation block.

6. The timing generator according to claim 5 wherein said logical operation block is configured such as to perform three logical operations including at least AND operation and OR operation.

7. A timing generator of an image input device which regulates a read timing in reading a pixel data from an image pickup device of said image input device, said timing generator comprising:
- a horizontal cycle block that outputs a horizontal cycle pulse in image obtained by said image pickup device;
- a vertical cycle block that outputs a vertical cycle pulse in image obtained by said image pickup device;
- a vertical-horizontal block that outputs a desired pulse in synchronization with said horizontal and vertical cycle blocks;
- a first logical operation block that performs predetermined multiple logical operations of the output from said vertical-horizontal block and the output from the horizontal cycle block;
- a first selector that selects one of said multiple logical operations performed in said first logical operation block;
- a second logical operation block that performs predetermined logical operations of the result of selection obtained in said first selector and the output from the vertical cycle block; and
- a second selector that selects one of said multiple logical operations performed in said second logical operation block.

8. The timing generator according to claim 7 wherein,
said horizontal cycle block comprises:
- (a) a first shift register having a plurality of registers so as to form a loop structure by which the output from the rearmost stage register is inputted to the foremost stage register;
- (b) a first comparator that compares the output from said first shift register with the count value of a horizontal frequency signal; and
- (c) a first toggle circuit that repeats a toggle operation based on the output signal from said first comparator, said vertical cycle block comprises:
- (d) a second shift register having a plurality of registers so as to form a loop structure by which the output from the rearmost stage register is inputted to the foremost stage register;
- (e) a second comparator that compares the output from said second shift register with the count value of a vertical frequency signal; and
- (f) a second toggle circuit that repeats a toggle operation based on the output signal from said second comparator, and said vertical-horizontal cycle block comprises:
- (g) a third shift register similar to said first shift register of said horizontal cycle block;
- (h) a fourth shift register similar to said second shift register of said vertical cycle block;
- (i) an AND operation circuit that carries out a logical production of said third and fourth shift registers;
- (j) a third toggle circuit that repeats a toggle operation based on the output signal from said AND operation circuit; and
- (k) a forced circuit by which said AND operation circuit is forced to be set to a predetermined logical state at any timing provided from the exterior, based on the output from said fourth shift register.

9. The timing generator according to claim 5 further comprising a selection determining block that determines a logical operation selection switching in said selector, wherein,
- said first comparator has the function of comparing the output from said first shift register with the count value of said horizontal frequency signal;
- said second comparator has the function of comparing the output from said second shift register with the count value of said horizontal frequency signal; and
- said selection determining block is a shift register that performs shifting of a register value at any timing including a horizontal cycle, to execute a logical operation selection switching in said selector.

10. A timing generator of an image input device which regulates a read timing in reading a pixel data from an image pickup device of said image input device, said timing generator comprising:
- a pulse generating circuit that generates a pulse signal of a desired first pattern;
- a first pulse change circuit on which at least part of said pulse signal of said first pattern supplied from said pulse generating circuit is masked for removal; and
- a second pulse change circuit that adds a new address to a pulse signal obtained by said removal on said first pulse change circuit, said pulse generating circuit having:
- (a) a first shift register having a plurality of registers so as to form a loop structure by which the output from the rearmost stage register is inputted to the foremost stage register;
- (b) a first comparator that compares the output from said first shift register with the count value of a horizontal frequency signal; and
- (c) a first toggle circuit that repeats a toggle operation based on the output signal from said first comparator, said first pulse change circuit having:
- (d) a second shift register having a plurality of registers so as to form a loop structure by which the output from the rearmost stage register is inputted to the foremost stage register;
- (e) a second comparator that compares the output from said second shift register with the count value of a horizontal or vertical frequency signal; and
- (f) a second toggle circuit that repeats a toggle operation based on the output signal from said second comparator, said second pulse change circuit having:
- (g) a third shift register having a plurality of registers so as to form a loop structure by which the output from the rearmost stage register is inputted to the foremost stage register;
- (h) a third comparator that compares the output from said third shift register with the count value of a horizontal or vertical frequency signal; and
- (i) a third toggle circuit that repeats a toggle operation based on the output signal from said third comparator, and wherein,
- a first logical operation is carried out in a predetermined logical operation block between said pulse generating circuit and said first pulse change circuit, so that at least part of a pulse signal of said first pattern is masked for removal, then, a second logical operation is carried out in a predetermined logical operation block between said pulse generating circuit and said second pulse change circuit, so that a new pulse is added to the result of said first logical operation.

11. A timing generator of an image input device which regulates a read timing in reading a pixel data from an image pickup device of said image input device, said timing generator comprising:

a pulse generating circuit that generates a desired pulse signal;

a continuous clock generating block that generates a continuous clock signal in a given cycle;

a full cycle pulse generating block that outputs a desired periodic signal at a full cycle timing related to a read timing of said image pickup device; and a selector that selects the output from said continuous clock generating block and the output from said pulse generating circuit, at a desired timing based on the output from said full cycle pulse generating block, said pulse generating circuit having at least:
(a) a shift register having a plurality of registers to form a loop structure by which the output from the rearmost stage register is inputted to the foremost stage register;
(b) a first comparator that compares the output from said shift register with the count value of a horizontal or vertical frequency signal; and
(c) a first toggle circuit that repeats a toggle operation based on the output signal from said first comparator, said continuous clock generating block having:
(d) a counter that counts pixel clock signals supplied from the exterior;
(e) an interval register defining a predetermined specific cycle;
(f) a second comparator that compares the value of said specific cycle defined by said interval register, with the count result of said counter, to output a reset signal to said counter per said specific cycle;
(g) a shift register having at least two registers connected in tandem, so as to form a loop structure;
(h) a third comparator that compares the output from said shift register with the output from said counter; and
(i) a second toggle circuit that repeats a toggle operation based on the output signal from said third comparator.

* * * * *